US012603398B2

(12) United States Patent
Jeong

(10) Patent No.: US 12,603,398 B2
(45) Date of Patent: Apr. 14, 2026

(54) ELECTRODE ASSEMBLY AND SECONDARY BATTERY INCLUDING SAME

(71) Applicant: Samsung SDI Co., Ltd., Yongin-si (KR)

(72) Inventor: Hyun Ki Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 502 days.

(21) Appl. No.: 17/635,619

(22) PCT Filed: Aug. 11, 2020

(86) PCT No.: PCT/KR2020/010616
§ 371 (c)(1),
(2) Date: Feb. 15, 2022

(87) PCT Pub. No.: WO2021/033985
PCT Pub. Date: Feb. 25, 2021

(65) Prior Publication Data
US 2022/0294088 A1     Sep. 15, 2022

(30) Foreign Application Priority Data

Aug. 20, 2019     (KR) ........................ 10-2019-0101982

(51) Int. Cl.
*H01M 50/538*          (2021.01)
*H01M 10/0525*          (2010.01)
*H01M 10/0587*          (2010.01)
(52) U.S. Cl.
CPC ..... *H01M 50/538* (2021.01); *H01M 10/0525* (2013.01); *H01M 10/0587* (2013.01)
(58) Field of Classification Search
CPC ............. H01M 50/538; H01M 50/531; H01M 50/533; H01M 50/534; H01M 50/536;
(Continued)

(56) References Cited

U.S. PATENT DOCUMENTS 8,021,781 B2 *     9/2011   Oh .................... H01M 10/0587
                                                                429/234
10,193,125 B2      1/2019   Doo et al.
(Continued)

FOREIGN PATENT DOCUMENTS

EP          3817123 A1 *   5/2021   ........ H01M 10/0431
JP      2006-260892 A      9/2006
(Continued)

OTHER PUBLICATIONS

English Translation of KR 20180000223A—Rechargeable Battery—Samsung SDI Co LTD; Jan. 2, 2018 (Year: 2018).*
(Continued)

*Primary Examiner* — Adam J Francis

(74) *Attorney, Agent, or Firm* — Womble Bond Dickinson (US) LLP

(57)          ABSTRACT

The present invention relates to an electrode assembly and a secondary battery including same. A jelly-roll-type electrode assembly comprises a positive electrode non-coated portion formed on a positive electrode plate, and a negative electrode non-coated portion formed on a negative electrode plate. The negative electrode non-coated portion includes a first negative electrode non-coated portion formed between the front end and the rear end of the negative electrode plate in the winding direction, and a second negative electrode non-coated portion formed at the rear end of the negative electrode plate. A negative electrode tab is disposed in the first negative electrode non-coated portion.

9 Claims, 14 Drawing Sheets

(58) Field of Classification Search
CPC ............. H01M 50/55; H01M 10/0525; H01M 10/0587; H01M 10/04; H01M 10/0431; H01M 10/052; H01M 4/13
See application file for complete search history.

(56) References Cited

U.S. PATENT DOCUMENTS

| | | | |
|---|---|---|---|
| 10,388,952 B2 | 8/2019 | Park et al. | |
| 2010/0310924 A1 | 12/2010 | Kaneda et al. | |
| 2011/0104539 A1* | 5/2011 | Oh | H01M 50/528 |
| | | | 429/211 |
| 2011/0197435 A1* | 8/2011 | Kaneko | H01M 10/0585 |
| | | | 156/196 |
| 2012/0196165 A1* | 8/2012 | Kim | H01M 50/119 |
| | | | 429/94 |
| 2013/0252086 A1* | 9/2013 | Stern | H01M 10/0585 |
| | | | 29/623.5 |
| 2015/0295270 A1* | 10/2015 | Chun | H01M 50/534 |
| | | | 429/211 |
| 2017/0092926 A1 | 3/2017 | Doo et al. | |
| 2018/0183059 A1* | 6/2018 | Park | H01M 50/538 |
| 2019/0252732 A1 | 8/2019 | Park et al. | |
| 2021/0203044 A1 | 7/2021 | Jeong et al. | |

FOREIGN PATENT DOCUMENTS

| | | | | |
|---|---|---|---|---|
| KR | 10-1192056 B1 | 10/2012 | | |
| KR | 10-2015-0050435 A | 5/2015 | | |
| KR | 10-2015-0083633 A | 7/2015 | | |
| KR | 10-2017-0036466 A | 4/2017 | | |
| KR | 10-2017-0118449 A | 10/2017 | | |
| KR | 10-2018-0000223 A | 1/2018 | | |
| KR | 20180000223 A | * | 1/2018 | ........ H01M 10/0422 |
| KR | 10-2018-0074178 A | 7/2018 | | |
| KR | 10-2019-0040525 A | 4/2019 | | |
| WO | WO 2019/074197 A1 | 4/2019 | | |

OTHER PUBLICATIONS

EPO Extended European Search Report dated Oct. 23, 2023, issued in European Patent Application No. 20853854.6 (7 pages).

Chinese Office Action for CN Application No. 202080058922.1 dated Jan. 9, 2024, 15 pages.

International Search Report for corresponding International Application No. PCT/KR2020/010616, dated Nov. 24, 2020 (5 pages).

* cited by examiner

ELECTRODE ASSEMBLY AND SECONDARY BATTERY INCLUDING SAME

CROSS-REFERENCE TO RELATED APPLICATION(S)

This application is a U.S. National Phase Patent Application of International Application No. PCT/KR2020/010616, filed on Aug. 11, 2020, which claims priority to Korean Application No. 10-2019-0101982, filed Aug. 20, 2019, the entire content of each of which is incorporated herein by reference.

TECHNICAL FIELD

The present invention relates to an electrode assembly and a secondary battery including the same.

BACKGROUND ART

In general, a secondary battery is formed by accommodating an electrode assembly constituted by a positive electrode plate, a negative electrode plate, and a separator sandwiched between the two electrode plates together with an electrolyte in a case. This secondary battery is a chargeable and dischargeable battery, unlike a primary battery that is not chargeable. Demand for secondary batteries as an energy source is increasing rapidly as technology development and production increase for mobile devices such as mobile phones and laptops. In recent years, active research and development are carried out for electric vehicles and hybrid vehicles as alternative energy sources to replace fossil fuels.

Currently commercialized secondary batteries include nickel cadmium batteries, nickel hydride batteries, nickel zinc batteries, and lithium secondary batteries. Among them, when compared to nickel-based secondary batteries, the lithium secondary batteries are attracting attention because of their advantages such as freedom of charging and discharging, very low self-discharge rate, and high energy density due to almost no memory effect.

In order to increase in output of a lithium secondary battery, resistance of the battery has to be lowered. In a limited volume, it is effective to increase in number of electrodes. In addition, the length of the electrode plate is gradually increasing as the need for high capacity and high output of the lithium secondary battery, which may lead to an increase in internal resistance. This problem may also be alleviated by increasing in number of electrode tabs. However, the increase in number of electrode tabs not only increases in required amount of material and man-hours, but also reduces the space utilization of the internal space of the lithium secondary battery.

Furthermore, in general, when the lithium secondary battery is overcharged to a certain voltage or more, the reaction between the positive electrode active material constituting the lithium secondary battery and the electrolyte may proceed excessively, resulting in structural collapse of the positive electrode active material and oxidation reaction of the electrolyte, and thus, lithium may also be precipitated. If this state continues, the lithium secondary battery may be ignited or exploded.

The above-described information disclosed in the technology that serves as the background of the present invention is only for improving understanding of the background of the present invention and thus may include information that does not constitute the related art.

DISCLOSURE OF THE INVENTION

Technical Problem

An object of the present invention for solving the above problems is to provide an electrode assembly capable of minimizing the number of electrode tabs while reducing resistance of a secondary battery, and a secondary battery including the same.

Another object of the present invention is to provide an electrode assembly capable of minimizing lithium precipitation during overcharging and a secondary battery including the same.

Technical Solution

In an electrode assembly and a secondary battery including the same according to the present invention for achieving the above object, the electrode assembly includes: a positive electrode plate including a positive electrode collector and a positive electrode active material applied on the positive electrode collector, wherein, in the positive electrode collector, a positive electrode non-coated portion, to which the positive electrode active material is not applied, is formed; a negative electrode plate including a negative electrode collector and a negative electrode active material applied on the negative electrode collector, wherein, in the negative electrode collector, a negative electrode non-coated portion, to which the negative electrode active material is not applied, is formed; a separator interposed between the positive electrode plate and the negative electrode plate; a positive electrode tab electrically connected to the positive electrode collector of the positive electrode plate; and a negative electrode tab electrically connected to the negative electrode collector of the negative electrode plate, wherein the positive electrode plate, the negative electrode plate, and the separator are wound in a state of being sequentially stacked, the positive electrode non-coated portion is disposed between front and rear ends of the positive electrode plate in a winding direction, the positive electrode tab is attached to the positive electrode collector on the positive electrode non-coated portion, the negative electrode non-coated portion includes a primary negative electrode non-coated portion formed between front and rear ends of the negative electrode plate in the winding direction and a secondary negative electrode non-coated portion formed on the rear end of the negative electrode plate, and the negative electrode tab is disposed on the primary negative electrode non-coated portion.

According to the present invention, the positive electrode non-coated portion may include a primary positive electrode non-coated portion and a secondary positive electrode non-coated portion, which are formed to be spaced apart from each other between the front and rear ends of the positive electrode plate in the winding direction, and the positive electrode tab may include a first positive electrode tab and a second positive electrode tab, which are disposed on the primary positive electrode non-coated portion and the secondary positive electrode non-coated portion, respectively. Here, the first positive electrode tab and the second positive electrode tab may be disposed on a straight line in a radial direction in the wound state. The primary positive electrode non-coated portion may be disposed closer to the front end of the positive electrode plate than the secondary positive electrode non-coated portion, and the primary positive electrode non-coated portion may extend to a width greater than that of the first positive electrode tab in the winding direction to form a positive electrode half coated portion, wherein the positive electrode half coated portion may be disposed inside one turn from the first positive electrode tab in the wound state. The primary positive electrode non-coated portion may be disposed closer to the front end of the positive electrode plate than the secondary positive electrode non-coated portion, and the primary positive electrode non-coated portion may extend to a width greater than that of the first positive electrode tab in the winding direction to form a positive electrode half coated portion, wherein the positive electrode half coated portion may be disposed outside one turn from the first positive electrode tab in the wound state.

The positive electrode plate may include a positive electrode half coated portion, on which the positive electrode coating layer is not formed, at a position spaced apart to be adjacent to the first positive electrode non-coated portion in the winding direction, wherein the positive electrode half coated portion may be disposed at a relatively front end side than the primary positive electrode non-coated portion and is disposed inside one turn from the first positive electrode tan in the wound state, or the positive electrode half coated portion may be disposed at a relatively rear end side than the primary positive electrode non-coated portion and is disposed outside one turn from the first positive electrode tan in the wound state.

In the electrode assembly and the secondary battery including the same according to the present invention, the first positive electrode tab and the second positive electrode tab may be disposed on a straight line in a radial direction in the wound state, and the positive electrode tab and the negative electrode tab may be disposed in a region corresponding to ⅕ to ⅘ of a radius of a transverse cross-section in the wound state. Here, the positive electrode tab and the negative electrode tab may be disposed on the same line in a longitudinal direction of the electrode assembly in the wound state, but a lower portion of the positive electrode tab and an upper portion of the negative electrode tab may be disposed so as not to overlap each other.

A secondary battery according to the present invention includes: the electrode assembly according to the present invention; a case configured to accommodate the electrode assembly and an electrolyte in an inner space thereof; and a cap plate coupled to an upper portion of the case to seal the case, wherein the secondary negative electrode non-coated portion may be attached to an inner surface of the case.

Advantageous Effects

The electrode assembly according to the present invention and the secondary battery including the same may reduce the number of negative electrode tabs without increasing in resistance of the secondary battery by allowing the non-coated portion formed at one end of the negative electrode plate to serve as the negative electrode tab, and thus the overall electrode tab number may be minimized.

In addition, the electrode assembly and the secondary battery including the same according to the present invention may form the non-coated portion on the positive electrode plate on which the positive electrode tab is not formed among the positive electrode plates adjacent to the negative electrode tab, thereby preventing the lithium from being deposited during the overcharging.

MODE FOR CARRYING OUT THE INVENTION

Figure 1A:
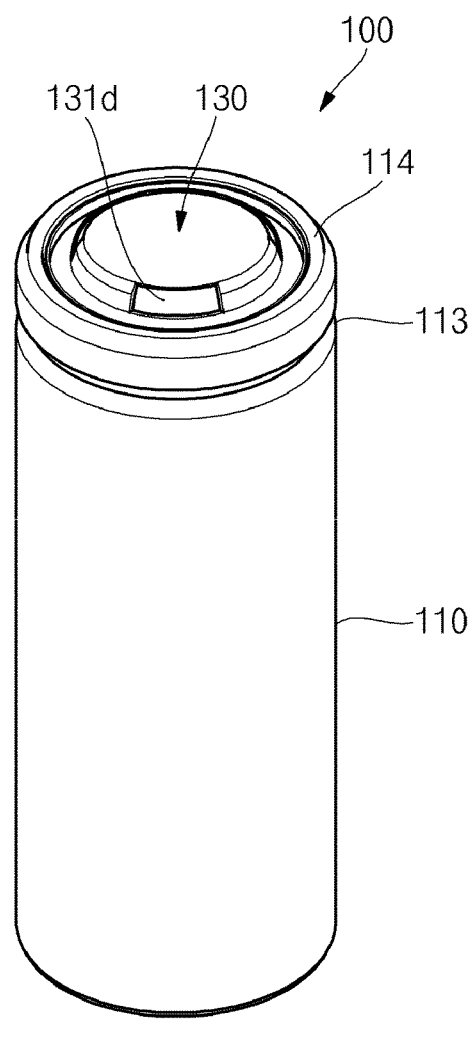
FIGS. 1a, 1b, 1c, and 1d are a perspective view, an exploded perspective view, a longitudinal cross-sectional view, and a cross-sectional view illustrating a secondary battery according to an embodiment of the present invention.

Hereinafter, preferred embodiments will be described in detail with reference to the accompanying drawings. The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise" and/or "comprising" used in this specification neither define the mentioned shapes, numbers, processes, operations, members, elements, and/or groups of these, nor exclude the presence or addition of one or more other different shapes, numbers, processes, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus the term "below" may encompass the term "above" or "below".

FIGS. 1a, 1b, 1c, and 1d are a perspective view, an exploded perspective view, a longitudinal cross-sectional view, and a transverse cross-sectional view illustrating a secondary battery 100 according to an embodiment of the present invention. Here, the longitudinal cross-section is a cross-section that is cut in a longitudinal direction of the secondary battery 100, and the transverse cross-section is a cross-section that is cut in a winding direction of the secondary battery.

As illustrated in FIGS. 1a, 1b, 1c, and 1d, the secondary battery 100 according to the present invention includes a case 110, an electrode assembly 120 accommodated in the case 110, and a cap assembly 130 that seals an opening of an upper end of the case 110.

The case 110 includes a circular bottom portion 111 and a side portion 112 extending by a predetermined length upward from the bottom portion 111. Here, although the secondary battery 100 is illustrated as a cylindrical secondary battery, it is applicable to prismatic and pouch-type secondary batteries, and a shape of the secondary battery is not limited to the cylindrical shape in the present invention. During a process of manufacturing the secondary battery 100, an upper portion of the case 110 may be opened. Thus, during a process of assembling the secondary battery, the electrode assembly 120 may be inserted into the case 110 together with an electrolyte. The case 110 may be made of steel, a steel alloy, aluminum, an aluminum alloy, or an equivalent thereof, but the material thereof is not limited thereto. In addition, in the can 110, a beading part 113 recessed inward may be formed at a lower portion of the can 110 with respect to the cap assembly 140 to prevent the cap assembly 140 from being separated to the outside, and a crimping part 114 bent inward may be formed at an upper portion of the can 110.

The electrode assembly 120 may be accommodated in the case 110 together with the electrolyte in a state of being wound in a substantially cylindrical shape. Here, the electrolyte is an organic liquid containing salt injected so that lithium ions move between a positive electrode plate and a negative electrode plate, which constitute the electrode assembly 120 and includes a non-aqueous organic electrolyte that is a mixture of lithium salt such as LiPF6, LiBF4, and LiClO4 with a high-purity organic solvent, but the present invention is not limited thereto.

The electrode assembly 120 includes a negative electrode plate 121 coated with a negative electrode active material, a positive electrode plate 122 coated with a positive electrode active material, and a separator 123 inserted between the negative electrode plate 121 and the positive electrode plate 122 to prevent short circuit from occurring between the negative electrode plate 121 and the positive electrode plate 122 and enabling only lithium ions to move. In addition, a negative electrode tab 124 protruding downward by a predetermined length may be attached to the negative electrode plate 121, and positive electrode tabs 125 129, each of which protrudes upward by a predetermined length, may be attached to the positive electrode plate 122. On the other hand, unlike the illustrated example, the protruding directions may be exchanged with each other. Here, 'the attachment' may be understood as being electrically connected to each other, i.e., being short-circuited using means such as welding or bonding.

Figure 1B:
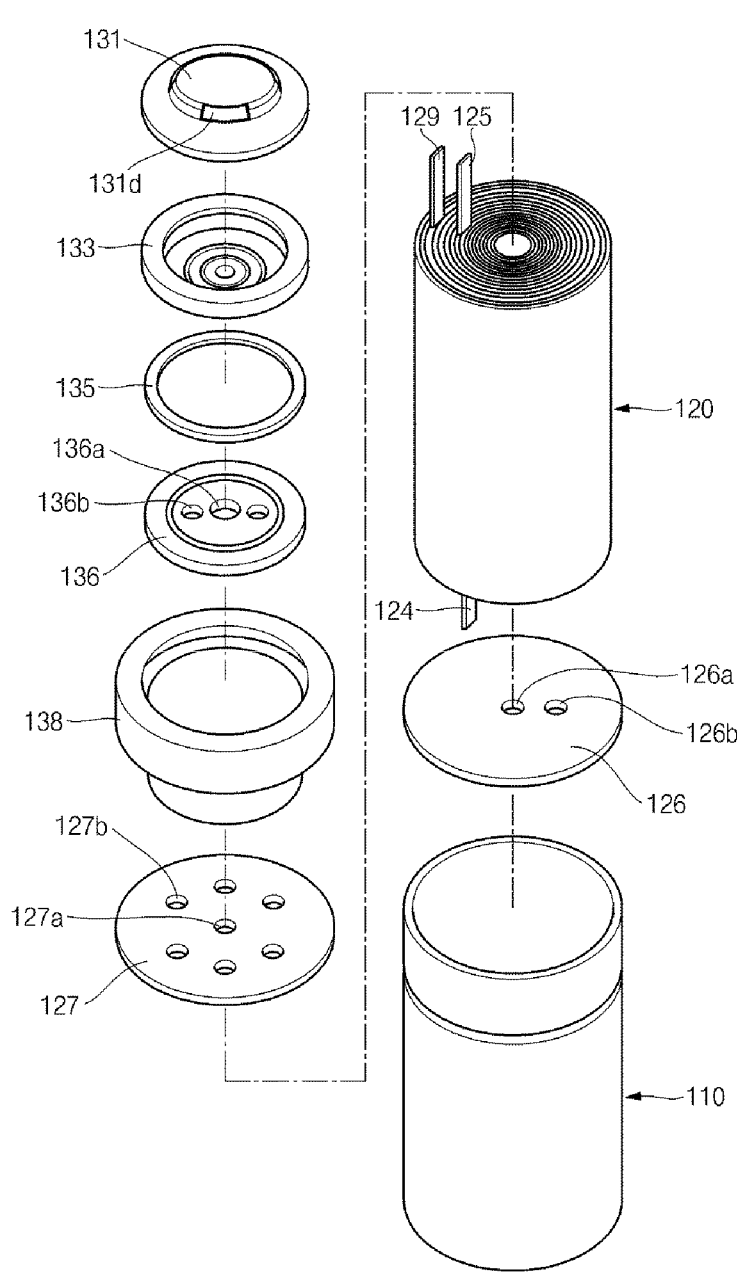
Figure 1C:
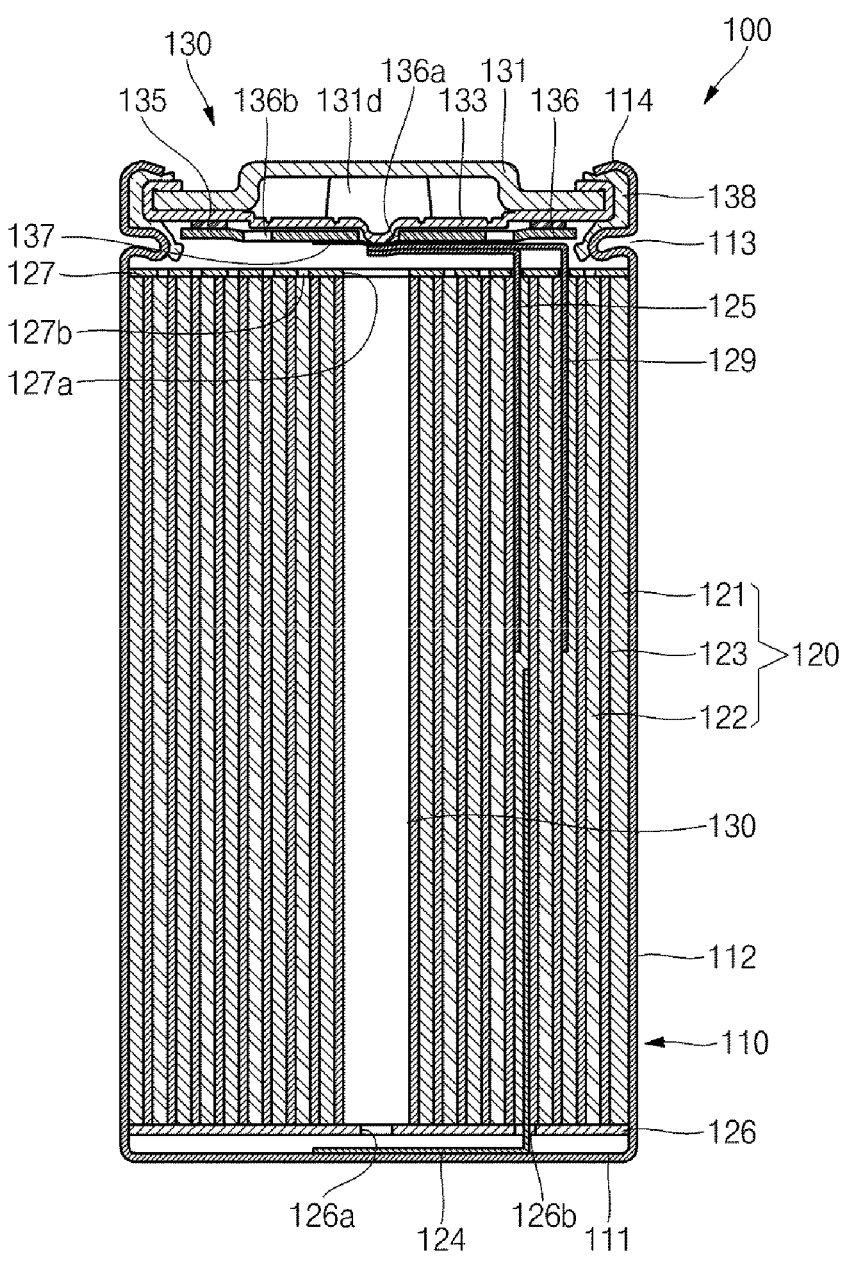
Figure 1D:
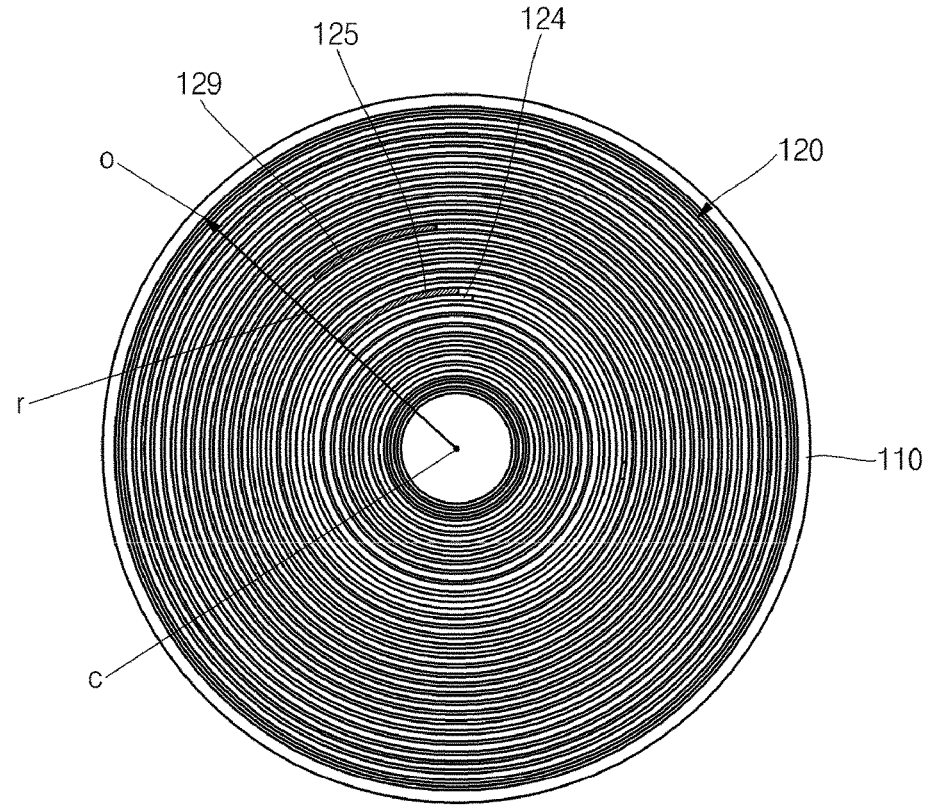

As illustrated in FIG. 1d, the electrode assembly 120 has a circular cross-sectional shape ideally, and an empty space including a winding central portion c may be formed during the winding process, which may be referred to as a core region. However, unlike the illustrated example, the cross-sectional shape of the core region does not always have to be circular.

Figure 2:
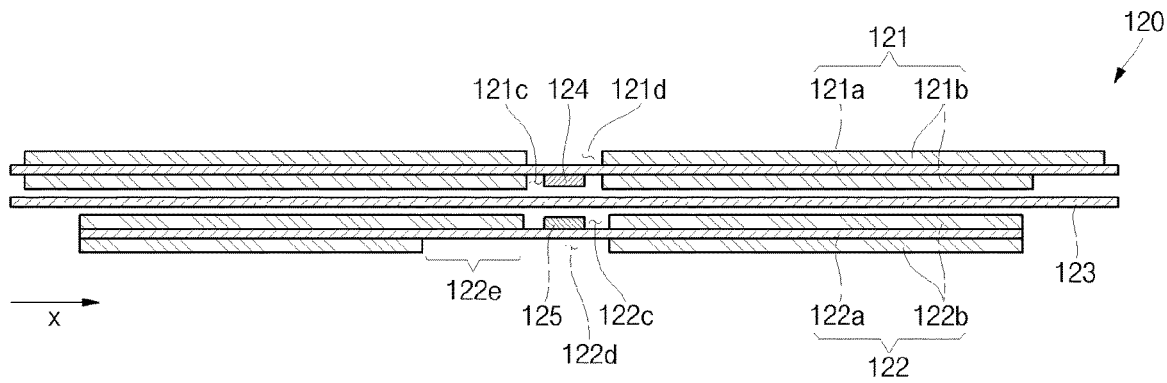
FIG. 2 is a cross-sectional view illustrating a state before an electrode assembly of the secondary battery illustrated in FIGS. 1a to 1d is wound.

Additionally, referring to FIG. 2, an exploded perspective view illustrating a state before the electrode assembly of the secondary battery illustrated in FIGS. 1a to 1d is wound is illustrated. Also, referring to FIG. 3, an enlarged transverse cross-sectional view illustrating a portion of a transverse cross-sectional view of the secondary battery having the electrode assembly illustrated in FIG. 2. Hereinafter, configurations of the secondary battery and the electrode assembly according to the present invention will be described in detail with reference to FIGS. 2 and 3.

First, in the negative electrode plate 121 of the electrode assembly 120, a negative electrode coating layer 121b, which is an active material made of a transition metal oxide, is applied on both sides of a negative electrode collector plate 121a, which is a plate-shaped metal foil made of copper (Cu) or nickel (Ni). The negative electrode plate 121 is provided with a negative electrode tab 124 attached to one surface of the negative electrode collector plate 121a. The negative electrode tab 124 may be partially welded and attached to the negative electrode collector plate 121a and protrude downward by a predetermined length in the longitudinal direction of the electrode assembly 120.

In addition, the negative electrode collector plate 121a is provided with a first negative electrode non-coated portion 121c on which the negative electrode coating layer 121b is not formed at a side on one surface, to which the negative electrode tab 124 is attached, in winding direction x and at both sides that are opposite to each other in the winding direction x. That is, the negative electrode tab 124 is attached to one surface of the negative electrode collector plate 121a of the negative electrode plate 121 so as to be spaced apart from the negative electrode coating layer 121b. In addition, the negative electrode collector plate 121a is also provided with a second negative electrode non-coated portion 121d, on which the negative electrode coating layer 121b is not formed on an area corresponding to the area corresponding to the negative electrode tab 124 and the area, on which the first negative electrode non-coated portion 121c is provided, on the other surface that is an opposite surface of the one surface on which the negative electrode tab 124 is attached.

In the transverse cross-section of the wound electrode assembly 120, the negative electrode tab 124 may be disposed at any one position between ⅕ to 45 of a transverse cross-sectional radius r, which is a length between the winding central portion c and the outermost portion o. Preferably, the negative electrode tab 124 may be disposed at an approximate center of the transverse cross-sectional radius r. The negative electrode tab 124 may be made of a copper or nickel material, but the present invention is not limited thereto.

The positive electrode plate 122 is coated with a positive electrode coating layer 122b that is an active material made of a transition metal oxide on both surfaces of the positive electrode collector 122a, which is plate-shaped metal foil made of aluminum (Al). The positive electrode plate 122 is provided with a positive electrode tab 125 attached to one surface of the positive electrode collector plate 122a. The positive electrode tab 125 may be partially welded and attached to the positive electrode current collector 122a and protrude upward by a predetermined length in the longitudinal direction of the electrode assembly 120.

Figure 4A:
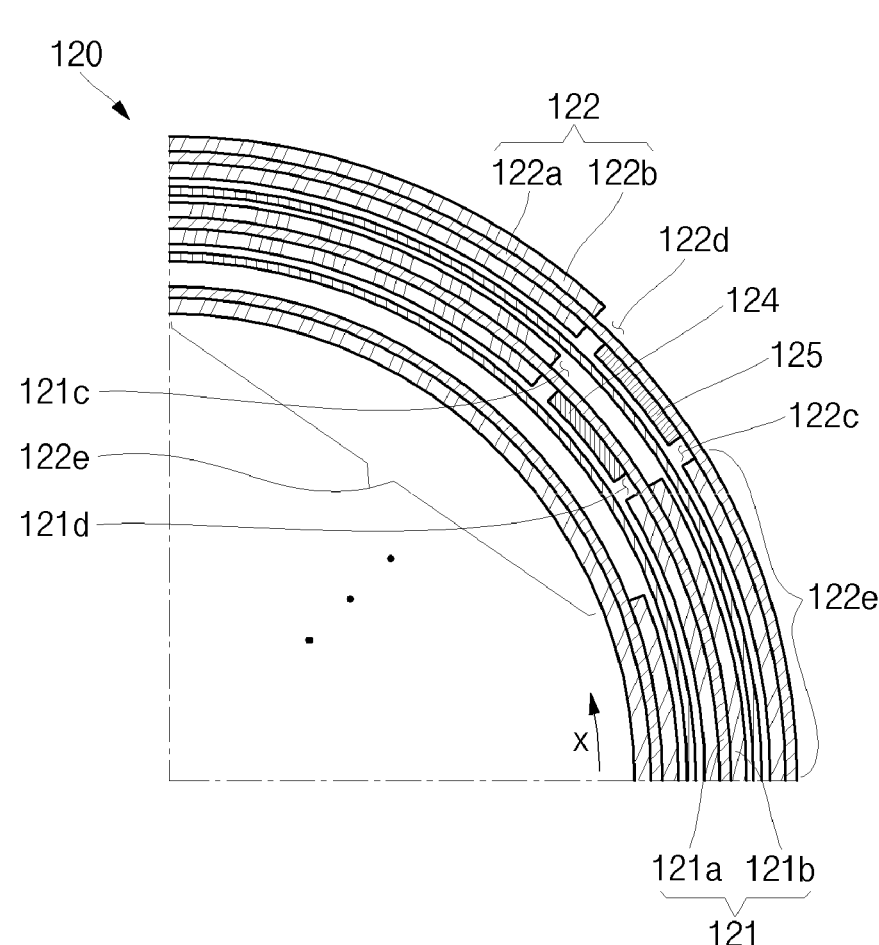
FIGS. 4a to 4c are enlarged transverse cross-sectional view additionally illustrating attached positions of a positive electrode tab and a negative electrode tab in the cross-sectional view of the electrode assembly illustrated in FIG. 3.
Figure 4B:
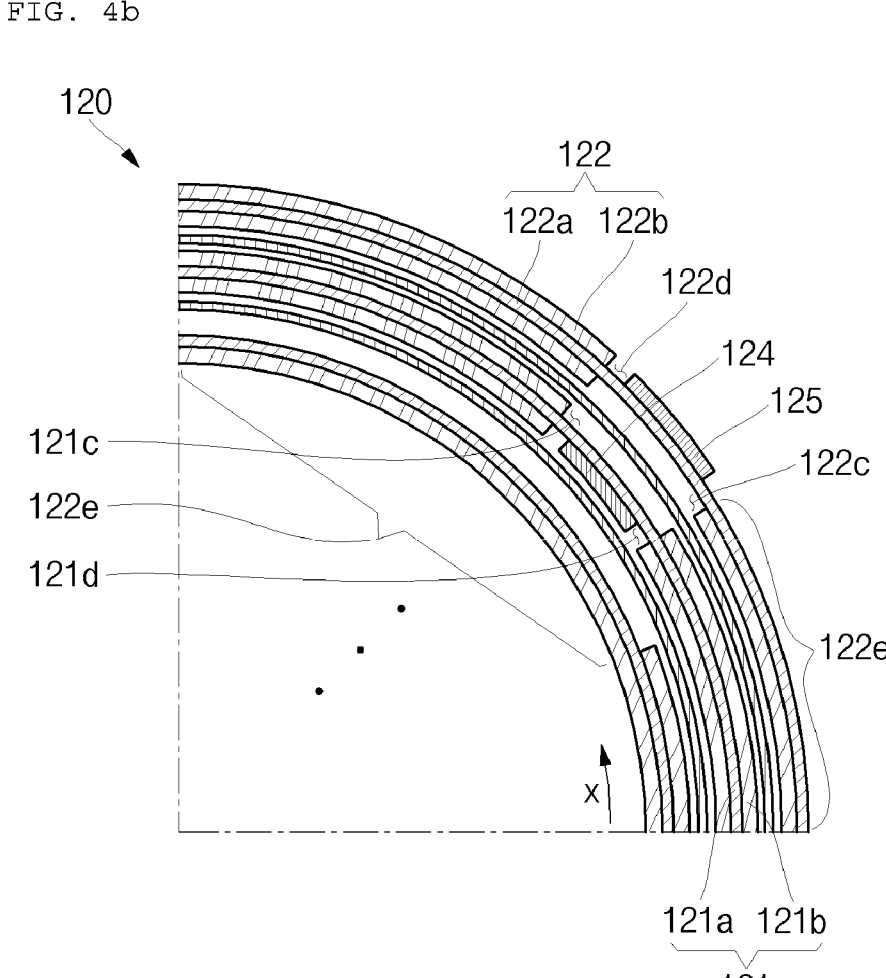
Figure 4C:
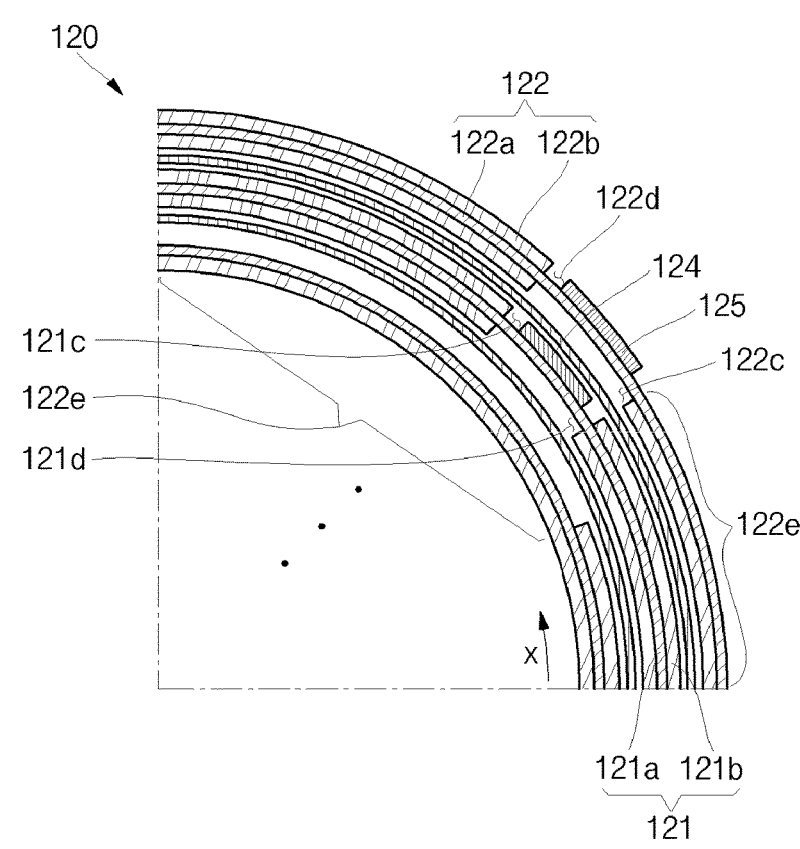

In the transverse cross-section of the wound electrode assembly 120, the positive electrode tab 125 may be disposed at any one position between ⅕ to 45 of a transverse cross-sectional radius r, which is a length between the winding central portion c and the outermost portion o. Preferably, the positive electrode tab 125 may be disposed at an approximate center of the transverse cross-sectional radius r. In addition, the positive electrode tab 125 may be disposed on a surface facing the negative electrode tab 124 with respect to the separator 123 in the wound electrode assembly 120, but the present invention is not limited thereto. The positive electrode tab 125 and the negative electrode tab 124 may be disposed on the same surface of the positive electrode plate 122 and the negative electrode plate 121 as illustrated in FIGS. 4a to 4c or may be disposed on opposite surfaces of the positive electrode plate 122 and the negative electrode plate 121, respectively. Here, the same surface may be the same surface facing the outermost side o of the wound electrode assembly 120 or may be a surface facing the winding central portion c in the same manner. In addition, the opposite surface means that, when the positive electrode tab 125 is formed on the surface facing the outermost side o of the wound electrode assembly 120, the negative electrode tab 124 is formed on the surface facing the winding central portion c or vice versa. That is, in the present invention, the surfaces to which the positive electrode tab 125 and the negative electrode tab 124 are attached are not limited to both surfaces of the positive electrode plate 122 and the negative electrode plate 121, each of which is made of foil.

As described above, in the transverse cross-section of the electrode assembly 120, on which both the positive electrode tab 125 and the negative electrode tab 124 are wound, since the positive electrode tab 125 and the negative electrode tab 124 are disposed between ⅕ to ⅘ of the cross-sectional radius r, which is the length between the winding central portion c and the outermost o, the positive electrode tab 125 and the negative electrode tab 124 may be disposed to be aligned on the same line in a longitudinal direction in the wound electrode assembly 120. Here, the positive electrode tab 125 and the negative electrode tab 124 are disposed so as not to overlap each other on the same line. That is, a lower portion of the positive electrode tab 125 and an upper portion of the negative electrode tab 124 may be disposed on the same line in the longitudinal direction of the electrode assembly 120 so as not to overlap each other. This may be generated when the positive electrode tab 125 and the negative electrode tab 124, which are thicker than the positive electrode plate 122 and the negative electrode plate 121, overlap each other in the longitudinal direction of the electrode assembly 120. This is to prevent a decrease in the winding roundness rate. In the electrode assembly 120, the positive electrode tab 125 may be disposed outside the negative electrode tab 124 with respect to the separator 123. The positive electrode tab 125 may be made of an aluminum material, but the present invention is not limited thereto.

In addition, the positive electrode collector plate 122a is provided with a first positive electrode non-coated portion 121c on which the negative electrode coating layer 121b is not formed at both sides, which are a side of one surface of the positive electrode collector plate 122a, to which the positive electrode tab 125 is attached, in the winding direction x and an opposite side in the winding direction x. That is, the positive electrode tab 125 is attached to one surface of the positive electrode collector plate 122a of the positive electrode plate 122 so as to be spaced apart from the positive electrode coating layer 122b. In addition, the positive electrode plate 122 is also provided with a second positive electrode non-coated portion 122d, on which the positive electrode coating layer 122b is not formed on an area corresponding to the area corresponding to the positive electrode tab 125 and the area, on which the first positive electrode non-coated portion 122c is provided, on the other surface that is an opposite surface of the one surface on which the positive electrode tab 125 is attached.

Figure 3:
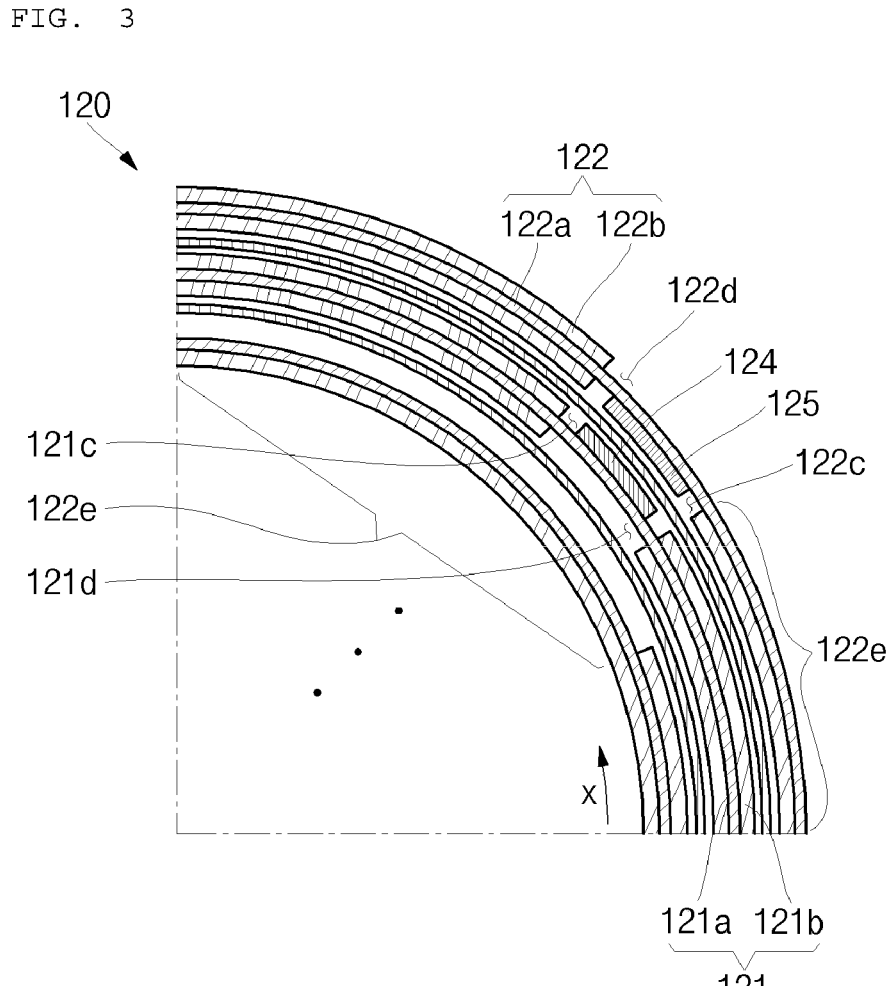
FIG. 3 is an enlarged transverse cross-sectional view illustrating a partially enlarged cross-sectional view after the electrode assembly illustrated in FIG. 2 is wound.

In addition, the positive electrode plate 122 is formed so that the second positive electrode non-coated portion 122d further extends in an opposite direction to the winding direction x. That is, the positive electrode plate 122 may be provided with a second positive electrode non-coated portion 122d, on which the positive electrode coating layer 122b is not formed, by a predetermined length in the opposite direction of the winding direction x from the area, to which the positive electrode tab 125 is attached, on the other surface of the positive electrode collector plate 122a. Preferably, the second positive electrode non-coated portion 122d extends in the direction of the winding central portion c that is turned once from the portion to which the positive electrode tab 125 is attached in the wound positive electrode plate 122. As described above, due to the second positive electrode non-coated portion 122d, the positive electrode plate 122 is provided with a positive electrode half coated portion 122e extending from the positive electrode tab 125 by one turn in the opposite direction to the winding direction x. Here, the positive electrode half coated portion 122e means that the positive electrode coating layer 122b is formed on only one surface of the positive electrode collector plate 122a. In FIGS. 2 and 3, the positive electrode half coated portion 122e is provided with the positive electrode coating layer on one surface, to which the positive electrode tab is attached, and the non-coated portion on the other surface, which is an opposite surface, and vice versa.

In this case, the wound electrode assembly 120 is provided with a positive electrode half coated portion 122e on the area of the positive electrode plate 122, on which the positive electrode tab 125 is not attached, on the positive electrode plate 122 inside and outside the portion, on which the negative electrode tab 124 is attached, which are closest to the negative electrode plate 121. Here, the inside means an area of the positive electrode plate that is closest to the direction of the winding center c with respect to the negative electrode plate 121, and the outside means an area of the positive electrode plate that is closest to the direction of the outermost side o with respect to the negative electrode plate 121. As described above, the positive electrode plate 122 forms the positive electrode half coated portion 122e at a position corresponding to the negative electrode tab 124 to prevent lithium from being deposited during overcharging.

The negative electrode tab 124 of the electrode assembly 120 may be welded to the bottom portion 111 of the case 110. Accordingly, the case 110 may operate as a negative electrode. Of course, on the contrary, the first and second positive electrode tabs 125 and 129 may be welded to the bottom portion 111 of the can 110, and in this case, the can 110 may operate as a positive electrode.

In addition, a first insulating plate 126 coupled to the case 110 and having a first hole 126a at a center thereof and a second hole 126b formed in the outside thereof may be interposed between the electrode assembly 120 and the bottom portion 111. The first insulating plate 126 may serve to prevent the electrode assembly 120 from being in electrical contact with the bottom portion 111 of the case 110. Particularly, the first insulating plate 126 may serve to prevent the positive electrode plate 122 of the electrode assembly 120 from electrically contacting the bottom portion 111. Here, the first hole 126a may serve to allow a gas to quickly move upward when a large amount of gas is generated due to abnormality in the secondary battery, and the second hole 126b may serve to allow the negative electrode tab 124 to pass therethrough so as to be welded to the bottom portion 111. Additionally, the electrode assembly 120 is further provided with a center pin (not shown) in the form of a hollow circular pipe at an approximate center so that a large amount of gas generated when the secondary battery is abnormal is easily discharged through an inner passage of the center pin.

In addition, a second insulating plate 127 coupled to the can 110 and having a first hole 127a at a center thereof and a plurality of second holes 127b formed in the outside thereof may be interposed between the electrode assembly 120 and the bottom portion 130. The second insulating plate 127 may serve to prevent the electrode assembly 120 from electrically contacting the cap assembly 130. Particularly, the second insulating plate 127 may serve to prevent the negative electrode plate 121 of the electrode assembly 120 from electrically contacting the cap assembly 130. Here, the first hole 127a may serve to allow a gas to quickly move to the cap assembly 130 when a large amount of gas is generated due to abnormality in the secondary battery, and the second hole 126b may serve to allow the positive electrode tab 125 to pass therethrough so as to be welded to the cap assembly 130. In addition, the remaining second hole 127b may serve to allow the electrolyte to quickly flow into the electrode assembly 120 during a process of injecting the electrolyte. The electrolyte may serve as a movement medium for the lithium ions generated by electrochemical reaction in the positive and negative plates inside the battery during charging and discharging.

The cap assembly 130 may include a cap-up 131 having a plurality of first and second through-holes 136a and 136b, a safety plate 133 installed on a lower portion of the cap-up 131, a connecting ring 135 installed on a lower portion of the safety plate 133, a cap-down 136 coupled to the connecting ring 135 and having first and second through-holes 136a and 136b, a sub-plate 137 fixed to a lower portion of the cap-down 136 and electrically connected to the positive electrode tab 125, and an insulating gasket 138 that insulates the cap-up 131, the safety plate 133, the connecting ring 135, and the cap-down 136 from a side portion 111 of the case 110.

Here, the insulating gasket 138 may be substantially compressed between a beading part 113, which is formed on the side portion of the case 110, and the crimping part 114. In addition, the through-hole 131d formed in the cap-up 131 and the through-hole 136b formed in the cap-down 136 may serve to discharge the internal gas to the outside when an abnormal internal pressure occurs inside the case 110. Of course, the safety plate 133 may be electrically separated from the sub-plate 137 as it is inverted upward by this internal pressure, and then, the safety plate 133 may be torn to discharge the internal gas to the outside.

Figure 5:
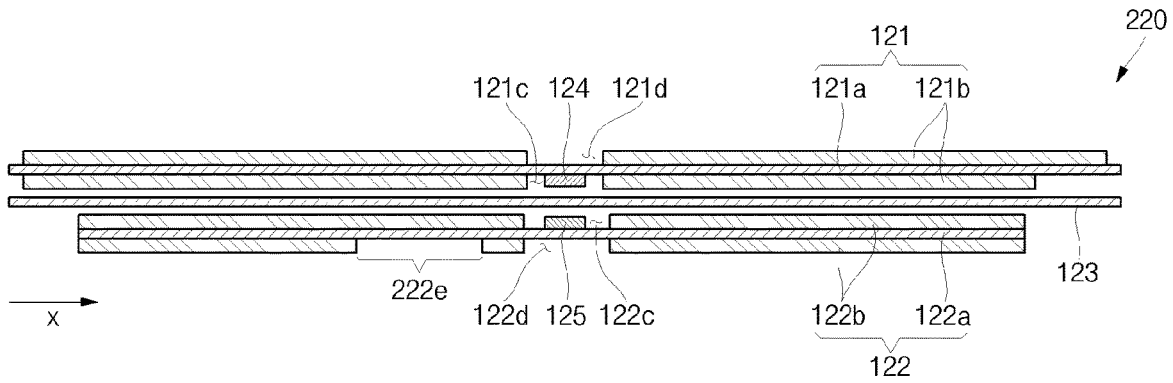
FIG. 5 is a cross-sectional view illustrating another example of the state before the electrode assembly of the secondary battery illustrated in FIGS. 1a to 1d is wound.

Referring to FIG. 5, another example of the cross-sectional view illustrating a state before the electrode assembly of the secondary battery illustrated in FIGS. 1a to 1d is wound is illustrated. Also, referring to FIG. 6, an enlarged transverse cross-sectional view illustrating a partially enlarged cross-sectional view after the electrode assembly illustrated in FIG. 5 is wound is illustrated.

Figure 6:
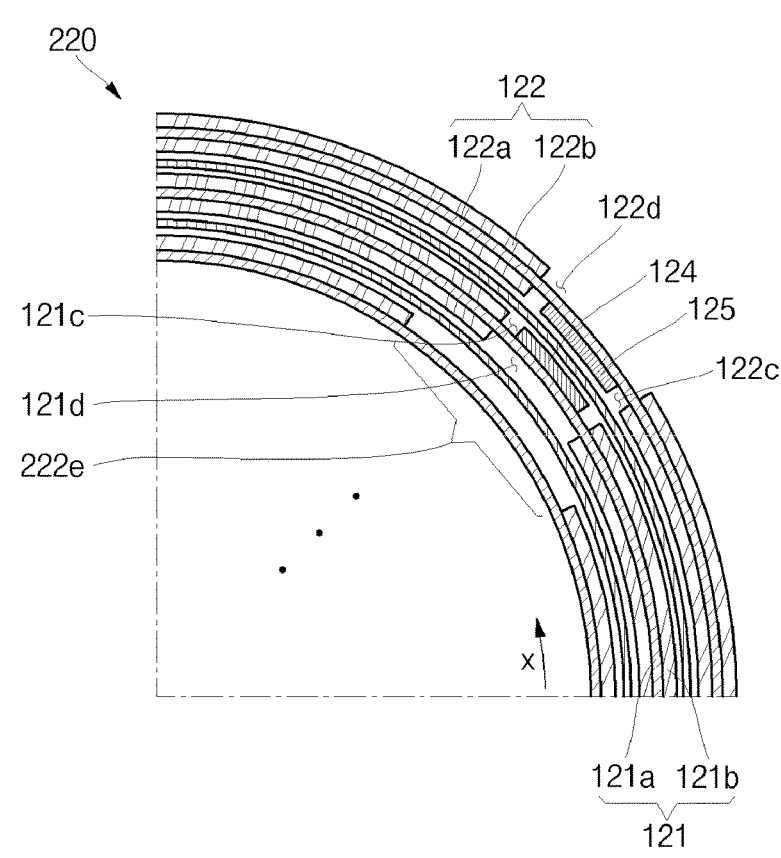
FIG. 6 is an enlarged transverse cross-sectional view illustrating a partially enlarged cross-sectional view after the electrode assembly illustrated in FIG. 5 is wound.

As described above, configurations of the case 110 of the secondary battery, the negative electrode plate 121 of the electrode assembly 120, the separator 123 of the electrode assembly 120, and the cap assembly 130, which are illustrated in FIGS. 5 and 6, may be the same as those of the secondary battery 100 illustrated in FIGS. 1a, 1b, and 1d. Thus, the configuration of the positive electrode plate 122 of the electrode assembly 220 of the secondary battery will be mainly described below with reference to FIGS. 1a, 1b, 1d, 5 and 6.

The positive electrode plate 122 is coated with the positive electrode coating layer 122b that is an active material made of a transition metal oxide on both surfaces of the positive electrode collector 122a, which is plate-shaped metal foil made of aluminum (Al). The positive electrode plate 122 is provided with the positive electrode tab 125 attached to one surface of the positive electrode collector plate 122a. The positive electrode tab 125 may be partially welded and attached to the positive electrode current collector 122a and protrude upward by a predetermined length in the longitudinal direction of the electrode assembly 220.

The positive electrode tab 125 may be disposed at an approximate center of the transverse cross-sectional radius r of the wound electrode assembly 220. In addition, the positive electrode tab 125 may be disposed at the same position facing the negative electrode tab 124 with respect to the separator 123 in the wound electrode assembly 220, but the present invention is not limited thereto. The positive electrode tab 125 and the negative electrode tab 124 may be disposed on the same surface of the positive electrode plate 122 and the negative electrode plate 121 as illustrated in FIGS. 4a to 4c or may be disposed on opposite surfaces of the positive electrode plate 122 and the negative electrode plate 121, respectively. That is, in the present invention, the surfaces to which the positive electrode tab 125 and the negative electrode tab 124 are attached are not limited to both surfaces of the positive electrode plate 122 and the negative electrode plate 121, each of which is made of foil.

In addition, the positive electrode tab 125 and the negative electrode tab 124 may be disposed to be aligned on the same line in the longitudinal direction of the wound electrode assembly 220. In addition, the positive electrode tab 125 and the negative electrode tab 124 may be disposed so as not to overlap each other in the longitudinal direction of the wound electrode assembly 220. This may be generated when the positive electrode tab 125 and the negative electrode tab 124, which are thicker than the positive electrode plate 122 and the negative electrode plate 121, overlap each other in the longitudinal direction of the electrode assembly 220. This is to prevent a decrease in the winding roundness rate. In the electrode assembly 220, the positive electrode tab 125 may be disposed on an area of the negative electrode tab 124 disposed outside the negative electrode tab 124 with respect to the separator 123. The positive electrode tab 125 may be made of an aluminum material, but the present invention is not limited thereto.

In addition, the positive electrode collector plate 122a is provided with a first positive electrode non-coated portion 121c on which the negative electrode coating layer 121b is not formed at both sides, which are a side of one surface of the positive electrode collector plate 122a, to which the positive electrode tab 125 is attached, in the winding direction x and an opposite side in the winding direction x. That is, the positive electrode tab 125 is attached to one surface of the positive electrode collector plate 122a of the positive electrode plate 122 so as to be spaced apart from the positive electrode coating layer 122b. In addition, the positive electrode plate 122 is also provided with a second positive electrode non-coated portion 122d, on which the positive electrode coating layer 122b is not formed on an area corresponding to the area corresponding to the positive electrode tab 125 and the area, on which the first positive electrode non-coated portion 122c is provided, on the other surface that is an opposite surface of the one surface on which the positive electrode tab 125 is attached.

In addition, in the wound electrode assembly 220, the positive electrode 122 is provided with a positive electrode half coated portion 222e on the positive electrode plate 122, on which the positive electrode tab 125 is not attached, on the positive electrode plate 122 inside and outside the portion, on which the negative electrode tab 124 is attached, which are closest to the negative electrode plate 121. Here, the positive electrode half coated portion 222e means that the positive electrode coating layer 122b is formed on only one surface of the positive electrode collector plate 122a, and the opposite surface is provided as a non-coated portion on which the positive electrode coating layer 122b is not formed. In the wound electrode assembly 220, the positive electrode half coated portion 222e is provided on an area of the positive electrode plate 122 inside the portion, to which the negative electrode tab 124 is attached, which is the closest to the negative electrode plate 121.

Here, the inside means an area of the positive electrode plate that is disposed in the direction of the winding center c with respect to the negative electrode plate 121, and the outside means an area of the positive electrode plate that is disposed in the direction of the outermost side o with respect to the negative electrode plate 121. In addition, the anode half coated portion 222e may be formed to have a width greater than that of each of the first negative electrode non-coated portion 121c and the second negative electrode non-coated portion 121d in a direction perpendicular to the longitudinal direction. This is to prevent misalignment of the positive electrode tab 125, the negative electrode tab 124, and the positive electrode half coated portion 222e when the electrode assembly 220 is wound.

In addition, the positive electrode half coated portion 222e is illustrated as having the positive electrode coated portion 122b formed on one surface to which the positive electrode tab 125 is attached and the non-coated portion formed on the other surface that is an opposite surface in FIGS. 5 and 6, and vice versa. As described above, the positive electrode plate 122 forms the positive electrode half coated portion 222e at a position corresponding to the negative electrode tab 124 to prevent lithium from being deposited when the secondary battery is overcharged.

Figure 7:
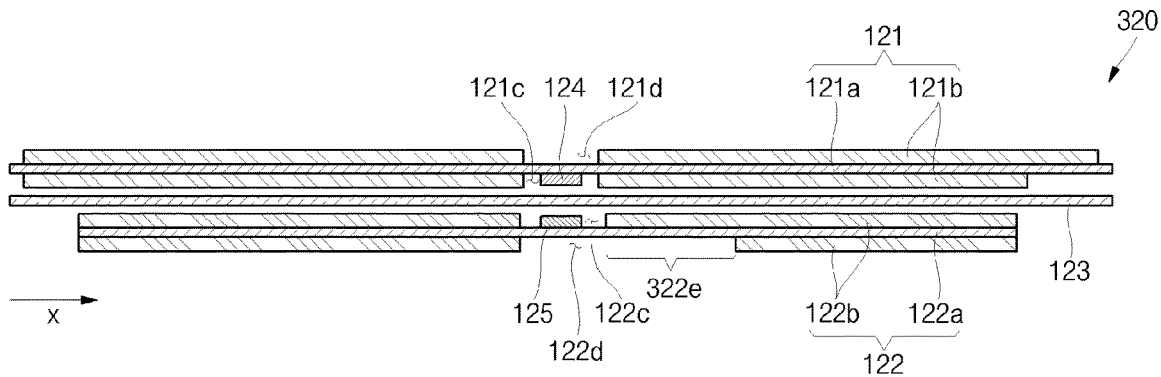
FIG. 7 is a cross-sectional view illustrating another example of the state before the electrode assembly of the secondary battery illustrated in FIGS. 1a to 1d is wound.

Referring to FIG. 7, another example of a cross-section illustrating a state before the electrode assembly of the secondary battery illustrated in FIGS. 1a to 1d is wound is illustrated. Also, referring to FIG. 8, an enlarged cross-sectional view illustrating a partially enlarged transverse cross-sectional view after the electrode assembly illustrated in FIG. 7 is wound is illustrated.

Figure 8:
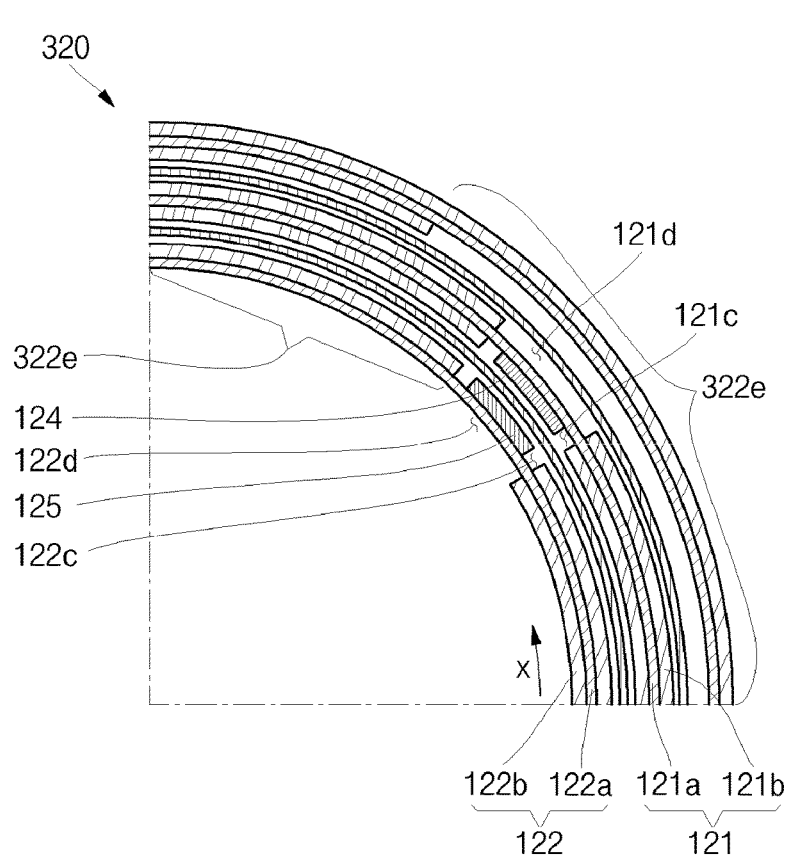
FIG. 8 is an enlarged transverse cross-sectional view illustrating a partially enlarged cross-sectional view after the electrode assembly illustrated in FIG. 7 is wound.

As described above, configurations of the case 110 of the secondary battery, the negative electrode plate 121 of the electrode assembly 120, the separator 123 of the electrode assembly 120, and the cap assembly 130, which are illustrated in FIGS. 7 and 8, may be the same as those of the secondary battery 100 illustrated in FIGS. 1a, 1b, and 1d. Thus, the configuration of the positive electrode plate 122 of the electrode assembly 320 of the secondary battery will be mainly described below with reference to FIGS. 1a, 1b, 1d, 7 and 8.

The positive electrode plate 122 is coated with the positive electrode coating layer 122b that is an active material made of a transition metal oxide on both surfaces of the positive electrode collector 122a, which is plate-shaped metal foil made of aluminum (Al). The positive electrode plate 122 is provided with a positive electrode tab 125 attached to one surface of the positive electrode collector plate 122a. The positive electrode tab 125 may be partially welded and attached to the positive electrode current collector 122a and protrude upward by a predetermined length in the longitudinal direction of the electrode assembly 320.

The positive electrode tab 125 may be disposed at an approximate center of the transverse cross-sectional radius r of the wound electrode assembly 220. In addition, the positive electrode tab 125 may be disposed at the same position facing the negative electrode tab 124 with respect to the separator 123 in the wound electrode assembly 320, but the present invention is not limited thereto. The positive electrode tab 125 and the negative electrode tab 124 may be disposed on the same surface of the positive electrode plate 122 and the negative electrode plate 121 as illustrated in FIGS. 4a to 4c or may be disposed on opposite surfaces of the positive electrode plate 122 and the negative electrode plate 121, respectively. That is, in the present invention, the surfaces to which the positive electrode tab 125 and the negative electrode tab 124 are attached are not limited to both surfaces of the positive electrode plate 122 and the negative electrode plate 121, each of which is made of foil.

In addition, the positive electrode tab 125 and the negative electrode tab 124 may be disposed to be aligned on the same line in the longitudinal direction of the wound electrode assembly 320. In addition, the positive electrode tab 125 and the negative electrode tab 124 may be disposed so as not to overlap each other in the longitudinal direction of the wound electrode assembly 320. This may be generated when the positive electrode tab 125 and the negative electrode tab 124, which are thicker than the positive electrode plate 122 and the negative electrode plate 121, overlap each other in the longitudinal direction of the electrode assembly 320. This is to prevent a decrease in the winding roundness rate. In the electrode assembly 320, the positive electrode tab 125 may be disposed inside the negative electrode plate 121 at the portion, to which the negative electrode tab 124 is attached, with respect to the separator 123. The positive electrode tab 125 may be made of an aluminum material, but the present invention is not limited thereto.

In addition, the positive electrode collector plate 122a is provided with a first positive electrode non-coated portion 121c on which the negative electrode coating layer 121b is not formed at both sides, which are a side of one surface of the positive electrode collector plate 122a, to which the positive electrode tab 125 is attached, in the winding direction x and an opposite side in the winding direction x. That is, the positive electrode tab 125 is attached to one surface of the positive electrode collector plate 122a of the positive electrode plate 122 so as to be spaced apart from the positive electrode coating layer 122b. In addition, the positive electrode plate 122 is also provided with a second positive electrode non-coated portion 122d, on which the positive electrode coating layer 122b is not formed on an area corresponding to the area corresponding to the positive electrode tab 125 and the area, on which the first positive electrode non-coated portion 122c is provided, on the other surface that is an opposite surface of the one surface on which the positive electrode tab 125 is attached.

In addition, the positive electrode plate 122 is formed so that the second positive electrode non-coated portion 122d further extends in the winding direction x. That is, the positive electrode plate 122 may be provided with a second positive electrode non-coated portion 122d, on which the positive electrode coating layer 122b is not formed, by a predetermined length in the winding direction x from the area, to which the positive electrode tab 125 is attached, on the other surface of the positive electrode collector plate 122a. Preferably, the second positive electrode non-coated portion 122d extends in the direction of the outermost side o that is turned once from the portion to which the positive electrode tab 125 is attached in the wound positive electrode plate 122. As described above, due to the second positive electrode non-coated portion 122d, the positive electrode plate 122 is provided with a positive electrode half coated portion 322e extending from the positive electrode tab 125 by one turn in the winding direction x. Here, the positive electrode half coated portion 322e means that the positive electrode coating layer 122b is formed on only one surface of the positive electrode collector plate 122a. In FIGS. 7 and 8, the positive electrode half coated portion 322e is provided with the positive electrode coated portion 122b on one surface, to which the positive electrode tab 125 is attached, and the non-coated portion on the other surface, which is an opposite surface, and vice versa.

In this case, the wound electrode assembly 320 is provided with a positive electrode half coated portion 322e on the positive electrode plate 122, on which the positive electrode tab 125 is not attached, on the positive electrode plate 122 inside and outside the portion, on which the negative electrode tab 124 is attached, which are closest to the negative electrode plate 121. Here, the inside means the positive electrode plate that is disposed in the direction of the winding center c with respect to the negative electrode plate 121, and the outside means the positive electrode plate that is disposed in the direction of the outermost side o with respect to the negative electrode plate 121. As described above, the positive electrode plate 122 forms the positive electrode half coated portion 322e at a position corresponding to the negative electrode tab 124 to prevent lithium from being deposited during overcharging.

Figure 9:
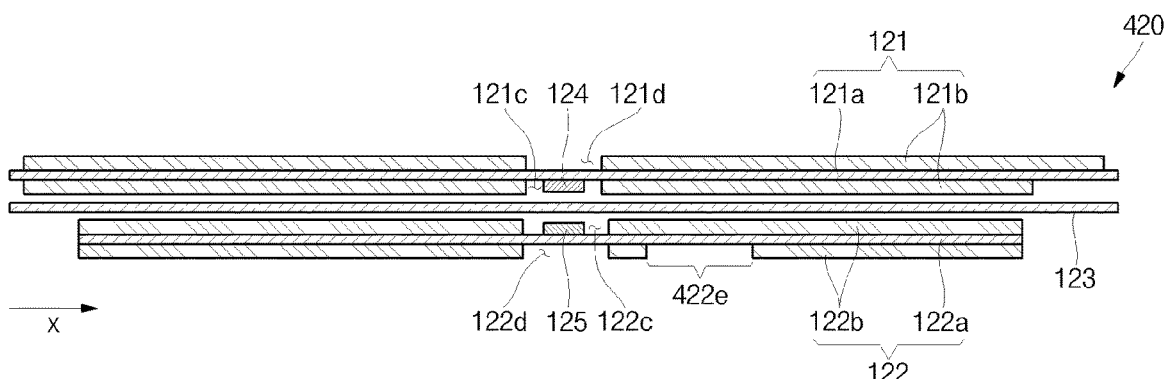
FIG. 9 is a cross-sectional view illustrating another example of the state before the electrode assembly of the secondary battery illustrated in FIGS. 1a to 1d is wound.

Referring to FIG. 9, another example of the cross-sectional view illustrating the state before the electrode assembly of the secondary battery illustrated in FIGS. 1a to 1d is wound is illustrated. Also, referring to FIG. 10, an enlarged transverse cross-sectional view illustrating a partially enlarged cross-sectional view after the electrode assembly illustrated in FIG. 9 is wound is illustrated.

Figure 10:
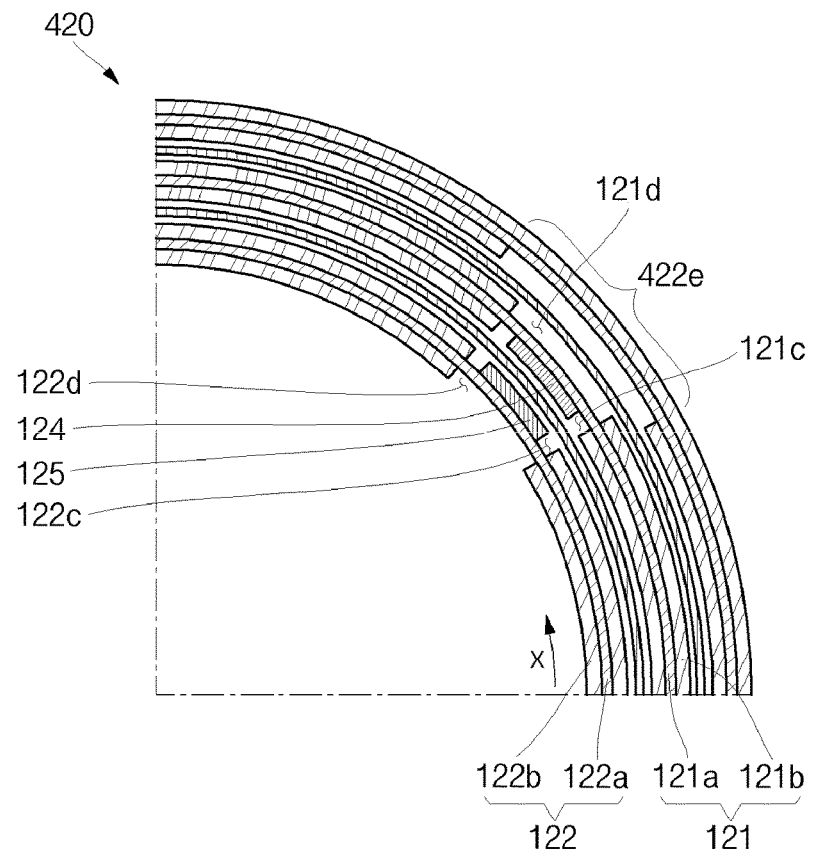
FIG. 10 is an enlarged transverse cross-sectional view illustrating a partially enlarged cross-sectional view after the electrode assembly illustrated in FIG. 9 is wound.

As described above, configurations of the case 110 of the secondary battery, the negative electrode plate 121 of the electrode assembly 120, the separator 123 of the electrode assembly 120, and the cap assembly 130, which are illustrated in FIGS. 9 and 10, may be the same as those of the secondary battery 100 illustrated in FIGS. 1a, 1b, and 1d. Thus, the configuration of the positive electrode plate 122 of the electrode assembly 420 of the secondary battery will be mainly described below with reference to FIGS. 1a, 1b, 1d, 9 and 10.

The positive electrode plate 122 is coated with the positive electrode coating layer 122b that is an active material made of a transition metal oxide on both surfaces of the positive electrode collector 122a, which is plate-shaped metal foil made of aluminum (Al). The positive electrode plate 122 is provided with the positive electrode tab 125 attached to one surface of the positive electrode collector plate 122a. The positive electrode tab 125 may be partially welded and attached to the positive electrode current collector 122a and protrude upward by a predetermined length in the longitudinal direction of the electrode assembly 420.

The positive electrode tab 125 may be disposed at an approximate center of the transverse cross-sectional radius r of the wound electrode assembly 420. In addition, the positive electrode tab 125 may be disposed at the same position facing the negative electrode tab 124 with respect to the separator 123 in the wound electrode assembly 420, but the present invention is not limited thereto. The positive electrode tab 125 and the negative electrode tab 124 may be disposed on the same surface of the positive electrode plate 122 and the negative electrode plate 121 as illustrated in FIGS. 4a to 4c or may be disposed on opposite surfaces of the positive electrode plate 122 and the negative electrode plate 121, respectively. That is, in the present invention, the surfaces to which the positive electrode tab 125 and the negative electrode tab 124 are attached are not limited to both surfaces of the positive electrode plate 122 and the negative electrode plate 121, each of which is made of foil.

In addition, the positive electrode tab 125 and the negative electrode tab 124 may be disposed to be aligned on the same line in the longitudinal direction of the wound electrode assembly 420. In addition, the positive electrode tab 125 and the negative electrode tab 124 may be disposed so as not to overlap each other in the longitudinal direction of the wound electrode assembly 420. This may be generated when the positive electrode tab 125 and the negative electrode tab 124, which are thicker than the positive electrode plate 122 and the negative electrode plate 121, overlap each other in the longitudinal direction of the electrode assembly 420. This is to prevent a decrease in the winding roundness rate. In the electrode assembly 420, the positive electrode tab 125 may be disposed inside the negative electrode plate 121 at the portion, to which the negative electrode tab 124 is attached, with respect to the separator 123. The positive electrode tab 125 may be made of an aluminum material, but the present invention is not limited thereto.

In addition, the positive electrode collector plate 122a is provided with a first positive electrode non-coated portion 121c on which the negative electrode coating layer 121b is not formed at both sides, which are a side of one surface of the positive electrode collector plate 122a, to which the positive electrode tab 125 is attached, in the winding direction x and an opposite side in the winding direction x. That is, the positive electrode tab 125 is attached to one surface of the positive electrode collector plate 122a of the positive electrode plate 122 so as to be spaced apart from the positive electrode coating layer 122b. In addition, the positive electrode plate 122 is also provided with a second positive electrode non-coated portion 122d, on which the positive electrode coating layer 122b is not formed on an area corresponding to the area corresponding to the positive electrode tab 125 and the area, on which the first positive electrode non-coated portion 122c is provided, on the other surface that is an opposite surface of the one surface on which the positive electrode tab 125 is attached.

In addition, in the wound electrode assembly 420, the positive electrode 122 is provided with a positive electrode half coated portion 422e on the positive electrode plate 122, on which the positive electrode tab 125 is not attached, on the positive electrode plate 122 inside and outside the portion, on which the negative electrode tab 124 is attached, which are closest to the negative electrode plate 121. Here, the positive electrode half coated portion 422e means that the positive electrode coating layer 122b is formed on only one surface of the positive electrode collector plate 122a, and the opposite surface is provided as a non-coated portion on which the positive electrode coating layer 122b is not formed. In the wound electrode assembly 420, the positive electrode half coated portion 422e is provided on the positive electrode plate 122 outside the portion, to which the negative electrode tab 124 is attached, which is the closest to the negative electrode plate 121.

Here, the inside means the positive electrode plate that is disposed in the direction of the winding center c with respect to the negative electrode plate 121, and the outside means the positive electrode plate that is disposed in the direction of the outermost side o with respect to the negative electrode plate 121. In addition, the anode half coated portion 422e may be formed to have a width greater than that of each of the first negative electrode non-coated portion 121c and the second negative electrode non-coated portion 121d in a direction perpendicular to the longitudinal direction. This is to prevent misalignment of the positive electrode tab 125, the negative electrode tab 124, and the positive electrode half coated portion 422e when the electrode assembly 420 is wound.

Figure 11:
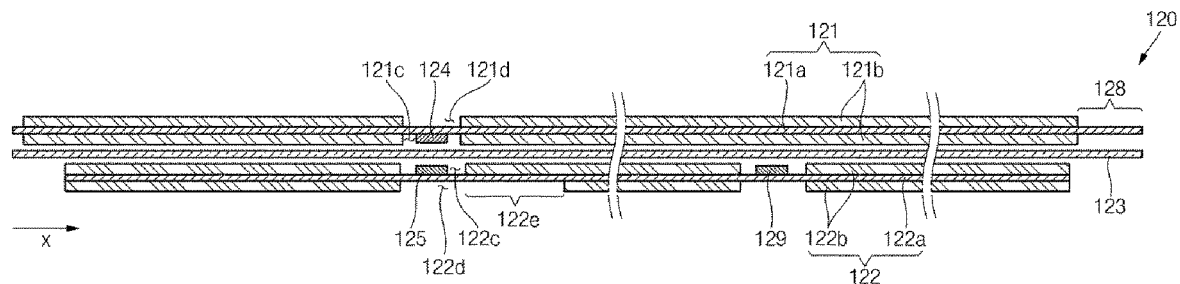
FIG. 11 is a cross-sectional view illustrating a state before the electrode assembly of the secondary battery illustrated in FIGS. 1a to 1d is wound.

In addition, the positive electrode half coated portion 422e is illustrated as having the positive electrode coated portion 122b formed on one surface to which the positive electrode tab 125 is attached and the non-coated portion formed on the other surface that is an opposite surface in FIGS. 9 and 10, and vice versa. As described above, the positive electrode plate 122 forms the positive electrode half coated portion 422e at a position corresponding to the negative electrode tab 124 to prevent lithium from being deposited when the secondary battery is overcharged. Referring to FIG. 11, a cross-sectional view illustrating the state before the electrode assembly 120 of the secondary battery illustrated in FIGS. 1a to 1d according to another embodiment of the present invention is illustrated. FIG. 11 illustrates a negative electrode plate 121, a positive electrode plate 122, a separator 123, a negative electrode tab 124, positive electrode tabs 125 and 129, and the like. However, for convenience of explanation, these are not illustrated as actual scales. For example, it should be noted that a thickness of the negative electrode tab 124 or the positive electrode tabs 125 and 129 may be thicker and wider, or the positive electrode non-coated portions 122c and 122d may be formed to be longer. Also, referring to FIG. 12, an enlarged transverse cross-sectional view illustrating a portion of the transverse cross-sectional view in a state in which the electrode assembly illustrated in FIG. 11 is wound is illustrated. Hereinafter, configurations of the secondary battery and the electrode assembly of the present invention will be described in more detail with reference to FIGS. 11 and 12.

In the negative electrode plate 121 of the electrode assembly 120, a negative electrode coating layer 121b, which is an active material made of a transition metal oxide, is applied on both sides of a negative electrode collector 121a, which is a plate-shaped metal foil made of copper (Cu) or nickel (Ni). A negative electrode tab 124 is attached to one surface of the negative electrode collector 121a. The negative electrode tab 124 may be partially welded and attached to the negative electrode collector 121a and may protrude downward by a predetermined length, for example, in a longitudinal direction of the electrode assembly 120 (see FIG. 1C). However, the negative electrode tab 124 may not necessarily protrude downward with respect to the longitudinal direction of the electrode assembly 120, but may protrude in another direction as necessary.

The negative electrode plate 121 may be wound, for example, from left to right (in the x direction of FIG. 2) based on the drawing direction of FIG. 2. Hereinafter, the x direction is referred to as a winding direction, and for convenience, a left end of the negative electrode plate 121 is referred to as a front end of the negative electrode plate 121, and a right end is referred to as a rear end of the negative electrode plate 121, based on the drawing direction of FIG. 2. In the state in which the winding is completed, the front end of the negative electrode plate 121 is in contact with a core region (see FIG. 1d).

In addition, in the negative electrode plate 121, a primary first negative electrode non-coated portion 121c and a primary second negative electrode non-coated portion 121c, i.e., primary negative electrode non-coated portions 121c and 121d, through which the negative electrode collector 121a is exposed in a state in which the negative electrode coating layer 121b is not formed on the negative electrode collector 121a. The negative electrode tab 124 may be attached to the negative electrode collector 121a in the primary negative electrode non-coated portions 121c and 121d, and in FIG. 11, particularly, it is illustrated as being attached to the primary first negative electrode non-coated portion 121c. A width in a winding direction of the primary first negative electrode non-coated portion 121c may be greater than that of the negative electrode tab 124 in the same direction, and thus, even after the negative electrode tab 124 is attached, a portion of the negative electrode collector 121a may be exposed. Although the primary negative electrode non-coated portions 121c and 121d are formed on bottom and top surfaces of the negative electrode collector 121*a* in FIG. 11, respectively, only the primary first negative electrode non-coated portion 121*c* may be formed on a surface, on which the negative electrode tab 124 is attached, of the two surfaces of the negative electrode collector 121*a*.

In the transverse cross-section of the wound electrode assembly 120, the negative electrode tab 124 may be disposed at any one position between ⅕ to 45 of a transverse cross-sectional radius r, which is a length between a winding central portion c and the outermost side o (see FIG. 1*d*). Preferably, the negative electrode tab 124 may be disposed at an approximate center of the transverse cross-sectional radius r. The negative electrode tab 124 may be made of copper or nickel, but is not limited thereto and may be made of other materials.

A secondary negative electrode non-coated portion 128 is formed at a rear end of the negative electrode plate 121. The secondary negative electrode non-coated portion 128 may be directly attached to an inner surface of a case 110 as described again below and thus may function as an electrode. Thus, the negative electrode plate 121 may have one negative electrode tab 124 and the secondary negative electrode non-coated portion 128 to function as if there are two negative electrode tabs, thereby minimizing the overall number of electrode tabs. In the secondary negative electrode non-coated portion 128, the negative electrode coating layer 121*b* is illustrated so as not to be formed on both sides of the negative electrode collector 121*a*, but, as necessary, the negative electrode coating layer may not be formed on only an outer surface of the negative electrode collector 121, i.e., a surface facing the outermost side o in the wound state.

The positive electrode plate 122 is coated with the positive electrode coating layer 122*b* that is an active material made of a transition metal oxide on both surfaces of the positive electrode collector 122*a*, which is plate-shaped metal foil made of aluminum (Al). Positive electrode tabs 125 and 129 are attached to one surface of the positive electrode collector 122*a*. The positive electrode tabs 125 and 129 may be welded and attached to the positive electrode collector 122*a* and may protrude upward by a predetermined length based on the longitudinal direction of the electrode assembly 120 (see FIG. 1*c*). However, like the case of the negative electrode tab 124 described above, the direction in which the positive electrode tabs 125 and 129 protrude may also be changed as necessary. For example, the negative electrode tab 124 may protrude upward, and the positive electrode tabs 125 and 129 may protrude downward, or the negative electrode tab 124 and the positive electrode tabs 125 and 129 may protrude in the same direction.

The positive electrode tabs 125 and 129 are exemplified to be divided into a first positive electrode tab 125 and a second positive electrode tab 129. Here, the second positive electrode tab 129 is different from the first positive electrode tab 125 only in position, and unless otherwise described, the description of the first positive electrode tab 125 may be equally applied to the second positive electrode tab 129.

In the transverse cross-section of the wound electrode assembly 120, the first positive electrode tab 125 may be disposed at any one position between ⅕ to 45 of a transverse cross-sectional radius r, which is a length between the winding central portion c and the outermost side o. Preferably, the first positive electrode tab 125 may be disposed at an approximate center of the transverse cross-sectional radius r. Of course, it may be equally applied to the second positive electrode tab 129. This consideration with respect to the position of the first positive electrode tab 125 is for the same reason as described for the negative electrode tab 124.

In addition, the positive electrode tab 125 may be disposed on each of the surface facing the negative electrode tab 124 with respect to the separator 123 in each of the negative electrode collector 121*a* and the positive electrode collector 122*a* of the wound electrode assembly 120. However, the present invention is not limited thereto. That is, the positive electrode tab 125 and the negative electrode tab 124 may be disposed on different surfaces of the negative electrode collector 121*a* and the positive electrode collector 122*a*, respectively. That is, in the present invention, the surface, to which the positive electrode tab 125 and the negative electrode tab 124 are attached, of both the surfaces of the negative electrode collector 121*a* and the positive electrode collector 122*a*, each of which has the form of foil, is not limited.

Figure 12:
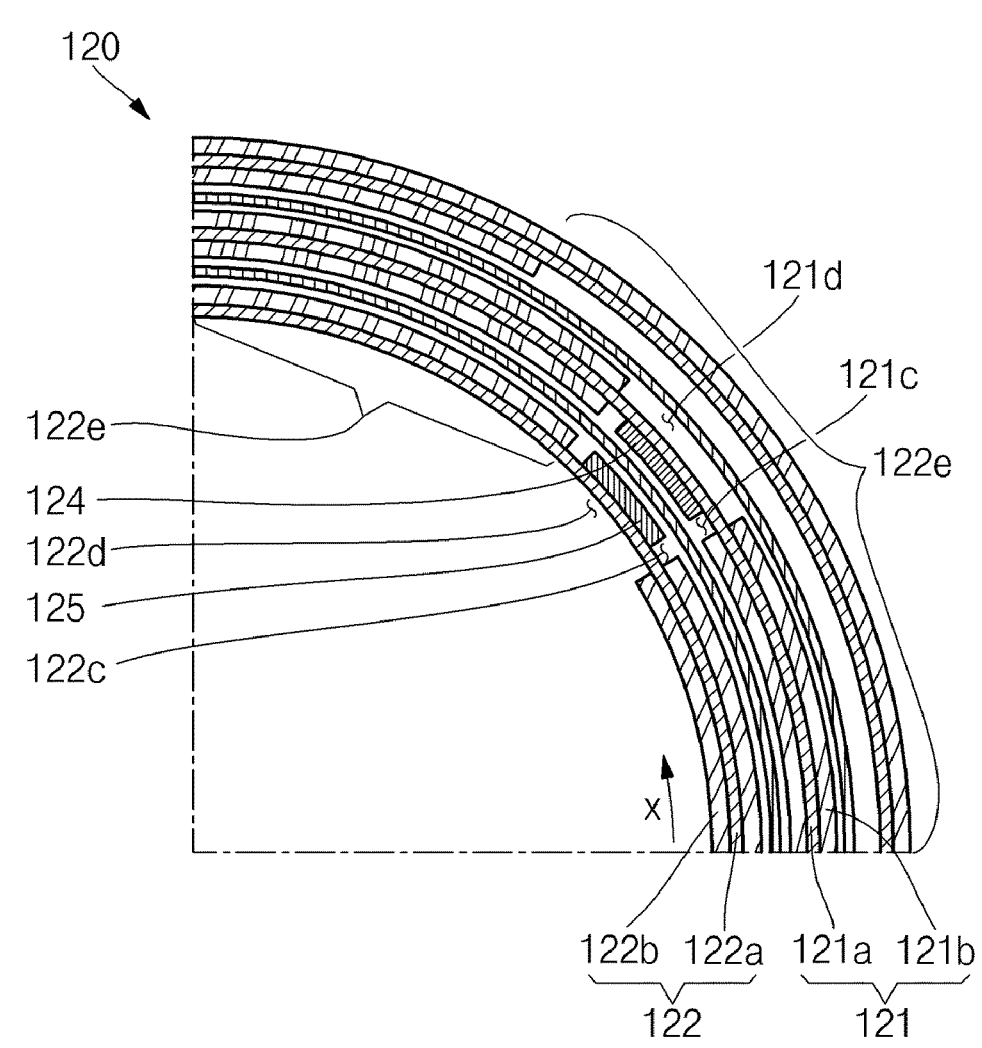
FIG. 12 is an enlarged transverse cross-sectional view illustrating a partially enlarged cross-sectional view after the electrode assembly illustrated in FIG. 11 is wound.
Figure 13:
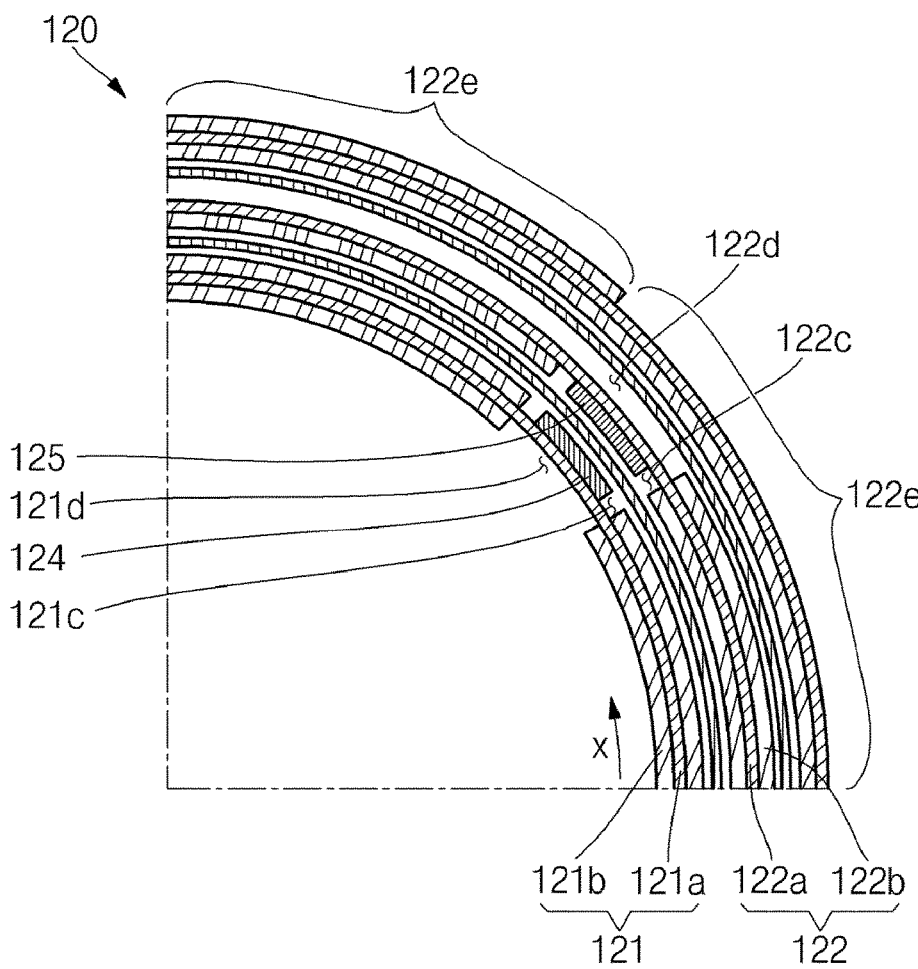
FIG. 13 is an enlarged transverse cross-sectional view illustrating a partially enlarged cross-sectional view after the electrode assembly illustrated in FIG. 11 is wound in a different manner.

In addition, although FIG. 12 illustrates an example in which the first positive electrode tab 125 is disposed closer to a central portion c than the negative electrode tab 124 with respect to the separator 123 in the wound state, the first positive electrode tab 125 may be disposed closer to the outermost side o than the negative electrode tab 124, and an example of the above-described structure is illustrated in FIG. 13.

In the positive electrode plate 122, a primary first positive electrode non-coated portion 122*c* and a primary second positive electrode non-coated portion 122*d*, i.e., primary positive electrode non-coated portions 122*c* and 122*d*, on which a positive electrode coating layer 122*b* is not formed, are formed in the positive electrode collector 122*a* to which the first positive electrode tab 125 is attached. That is, the first positive electrode tab 125 may be attached to the positive electrode collector 122*a* in the primary first positive electrode non-coated portion 122*c*, and a width in a winding direction of the primary first positive electrode non-coated portion 122*c* is greater than of the first positive electrode tab 125 in the same direction, and thus, a portion of the positive electrode collector 122*a* may be exposed even after the first positive electrode tab 125 is attached. Although the primary positive electrode non-coated portions 121*c* and 121*d* are formed on bottom and top surfaces of the positive electrode collector 122*a* in FIG. 11, respectively, only the primary first positive electrode non-coated portion 122*c* may be formed on a surface, on which the positive electrode tab 125 is attached, of the two surfaces of the positive electrode collector 122*a*.

Meanwhile, the primary second positive electrode non-coated portion 122*d* may be formed to extend toward the rear end in the winding direction x. That is, as illustrated in FIG. 11, the primary second positive electrode non-coated portion 122*d* formed on a bottom surface of the positive electrode collector 122*a* may extend by a predetermined length in the winding direction x from the area to which the first positive electrode tab 125, and thus, a positive electrode half coated portion 122*e*, on which the positive electrode coating layer 122*b* is not formed, may be formed. Preferably, the positive electrode half coated portion 122*e* may be disposed at a position corresponding to the first positive electrode tab 125 before one turn from the portion to which the first positive electrode tab 125 is attached in the wound state. In other words, in the wound state, the positive electrode half coated portion 122*e* may be positioned on the same straight line as the first positive electrode tab 125 in a radial r direction. As described above, instead of the primary second positive electrode non-coated portion 122*d* on the bottom surface of the positive electrode collector 122*a*, the primary first positive electrode non-coated portion 122*c* on the top surface may extend in the winding direction x to form the positive electrode half coated portion, and both surfaces may extend in the winding direction x to form the positive electrode half coated portion on each of both the surfaces. Particularly, the former may be disposed at a position corresponding to the first positive electrode tab 125 before one turn from the portion to which the first positive electrode tab 125 is attached in the wound state. The direction in which the primary positive electrode non-coated portions 122c and 122d may not be a direction extending from the first positive electrode tab 125 toward the rear end with respect to the winding direction x as in the example of FIG. 11, but be a direction extending toward the front end. Even in this case, in the wound state, it is preferable that the positive electrode half coated portion due to the first positive electrode non-coated portions 122c and 122d is disposed on the same straight line as the first positive electrode tab 125 in the radial r direction.

The second positive electrode tab 129 is disposed to be spaced apart from the first positive electrode tab 125 in the winding direction x. A secondary positive electrode non-coated 5 portion may be formed for attachment of the second positive electrode tab 129, and the secondary positive electrode non-coated portion may be essentially the same as the first positive electrode non-coated portion 122c and 122d. That is, a positive electrode half coated portion may be formed also around the second positive electrode tab 129.

In the example illustrated in FIG. 11, in the wound state, when the positive electrode half coated portion 122e due to the first positive electrode tab 125 and the primary second positive electrode non-coated portion 122d is disposed on the same straight line in the radial r direction, it may help to suppress lithium deposition during overcharging.

Figure 14:
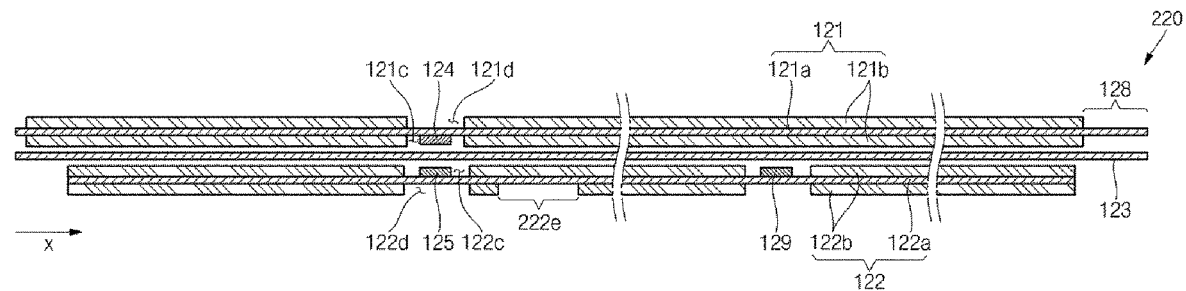
FIG. 14 is a cross-sectional view illustrating a state before an electrode assembly of a secondary battery is wound according to another embodiment of the present invention.

Referring to FIG. 14, another example of the cross-sectional view illustrating the state before the electrode assembly of the secondary battery illustrated in FIGS. 1a to 1d is wound is illustrated. Also, referring to FIG. 15, an enlarged cross-sectional view illustrating a partially enlarged transverse cross-sectional view after the electrode assembly illustrated in FIG. 14 is wound is illustrated.

Figure 15:
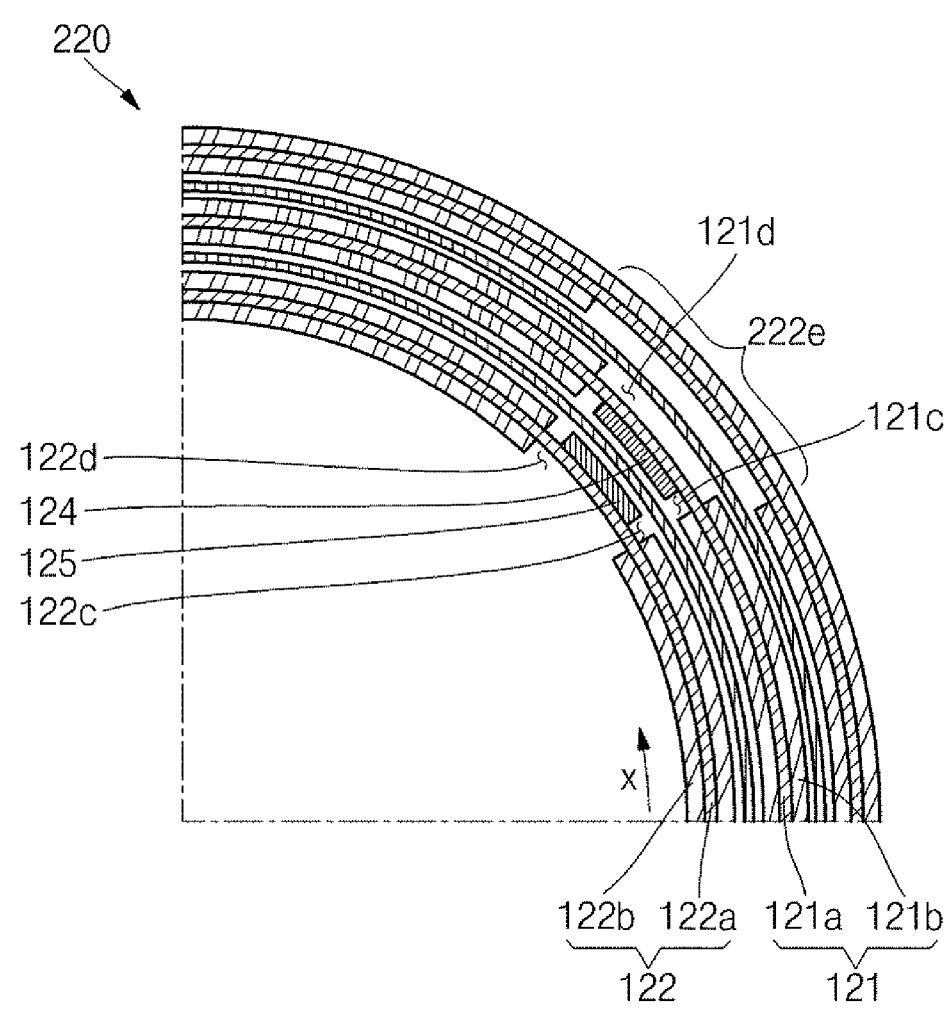
FIG. 15 is an enlarged transverse cross-sectional view illustrating a partially enlarged transverse cross-sectional view after the electrode assembly illustrated in FIG. 14 is wound.

As described above, configurations of the case 110 of the secondary battery, the negative electrode plate 121 of the electrode assembly 120, the separator 123 of the electrode assembly 120, and the cap assembly 130, which are illustrated in FIGS. 14 and 15, may be the same as those of the secondary battery 100 illustrated in FIGS. 1a to 1d. Thus, differences will be mainly described below with reference to FIGS. 1a to 1d, 14, and 15 based on the configuration of the positive electrode plate 122 of the electrode assembly 120 of the secondary battery.

In the positive electrode plate 122, the positive electrode half coated portion 222e may be formed to be spaced apart from the primary second positive electrode non-coated portion 122d. The positive electrode half coated portion 222e may be disposed only between the primary positive electrode non-coated portion and the secondary positive electrode non-coated portion, but may be disposed more adjacent to the primary positive electrode non-coated portion. More preferably, the positive electrode half coated portion 222e may be disposed at a position corresponding to the first positive electrode tab 125 before one turn from each of the primary positive electrode non-coated portions 122c and 122d in the wound state. In this state, it may correspond to the result of intermittently forming the positive electrode coating layer 122b in the middle of the primary second positive electrode non-coated portion 122d, in which the positive electrode half coated portion 222e extends in the winding direction x in the embodiment illustrated with reference to FIG. 11 above to form the positive electrode half coated portion 122e. This may have the effect of increasing in length of a section in which the positive electrode coating layer 122b is formed on the entire positive electrode plate 122, and also, a designer may propose a variety of choices so that the first positive electrode tab 125 and the positive electrode half coated portion 222e are disposed on the same straight line in the radial direction according to the thickness of the electrode assembly, the size of the wound electrode assembly in the radial direction, and the like. In FIGS. 14 and 15, the positive electrode half coated portion 222e may be exemplified as being formed only on the bottom surface based on the drawing direction of the positive electrode collector 122a, but may be formed on an opposite surface instead of this configuration, for example, may be formed on all of both surfaces. In another embodiment that is not shown, the positive electrode half coated portion 222e may be disposed on a front end rather than the primary positive electrode non-coated portions 122c and 122d, and in this case, the positive electrode half coated portion 222e may be disposed to correspond to the first positive electrode tab 125 before one turn from the primary positive electrode non-coated portions 122c and 122d. As previously described with reference to FIGS. 12 and 13, although FIG. 15 illustrates an example in which the first positive electrode tab 125 is disposed closer to a central portion c than the negative electrode tab 124 with respect to the separator 123 in the wound state, the first positive electrode tab 125 may be disposed closer to the outermost side o than the negative electrode tab 124.

The invention claimed is:

1. An electrode assembly comprising:
a positive electrode plate comprising a positive electrode collector and a positive electrode active material applied on the positive electrode collector, wherein, in the positive electrode collector, a positive electrode non-coated portion, to which the positive electrode active material is not applied, is formed;
a negative electrode plate comprising a negative electrode collector and a negative electrode active material applied on the negative electrode collector, wherein, in the negative electrode collector, a negative electrode non-coated portion, to which the negative electrode active material is not applied, is formed;
a separator interposed between the positive electrode plate and the negative electrode plate;
a positive electrode tab electrically connected to the positive electrode collector of the positive electrode plate; and
a negative electrode tab electrically connected to the negative electrode collector of the negative electrode plate,
wherein the positive electrode plate, the negative electrode plate, and the separator are wound in a state of being sequentially stacked,
wherein the positive electrode non-coated portion is disposed between a front end and a rear end of the positive electrode plate in a winding direction,
wherein the positive electrode tab is attached to the positive electrode collector on the positive electrode non-coated portion,
wherein the negative electrode non-coated portion comprises a primary negative electrode non-coated portion formed between a front end and a rear end of the negative electrode plate in the winding direction and a secondary negative electrode non-coated portion formed on the rear end of the negative electrode plate, wherein the negative electrode tab is disposed on the primary negative electrode non-coated portion, wherein the positive electrode plate comprises:

a first positive electrode coated portion, in which the positive electrode active material is formed on both surfaces of the positive electrode collector, at the front end of the positive electrode plate;

a second positive electrode coated portion, in which the positive electrode active material is formed on both surfaces of the positive electrode collector, at the rear end of the positive electrode plate;

a third positive electrode coated portion, in which the positive electrode active material is formed on both side of the positive electrode collector, at a position adjacent to the positive electrode non-coated portion; and a positive electrode half coated portion, in which the positive electrode active material is formed on one surface of the positive electrode collector, at a position between the first and third positive electrode coated portions, with the positive electrode half coated portion being adjacent to the first and third positive electrode coated portion, or between the second and third positive electrode coated portions.

2. The electrode assembly of claim 1, wherein the positive electrode non-coated portion comprises a primary positive electrode non-coated portion and a secondary positive electrode non-coated portion, which are formed to be spaced apart from each other between the front and rear ends of the positive electrode plate in the winding direction, and the positive electrode tab comprises a first positive electrode tab and a second positive electrode tab, which are disposed on the primary positive electrode non-coated portion and the secondary positive electrode non-coated portion, respectively.

3. The electrode assembly of claim 2, wherein the positive electrode half coated portion is at a position spaced apart from the primary positive electrode non-coated portion in the winding direction.

4. The electrode assembly of claim 3, wherein the positive electrode half coated portion is disposed at a relatively front end side than the primary positive electrode non-coated portion and is disposed inside one turn from the first positive electrode tab in a wound state.

5. The electrode assembly of claim 3, wherein the positive electrode half coated portion is disposed at a relatively rear end side than the primary positive electrode non-coated portion and is disposed outside one turn from the first positive electrode tab in a wound state.

6. The electrode assembly of claim 2, wherein the first positive electrode tab and the second positive electrode tab are disposed on a straight line in a radial direction in a wound state.

7. The electrode assembly of claim 1, wherein the positive electrode tab and the negative electrode tab are disposed in a region corresponding to $\frac{1}{5}$ to $\frac{4}{5}$ of a radius of a transverse cross-section in a wound state.

8. The electrode assembly of claim 7, wherein the positive electrode tab and the negative electrode tab are disposed on the same line in a longitudinal direction of the electrode assembly in a wound state, wherein a lower portion of the positive electrode tab and an upper portion of the negative electrode tab are disposed so as not to overlap each other.

9. A secondary battery comprising:

the electrode assembly of claim 1;

a case configured to accommodate the electrode assembly and an electrolyte in an inner space thereof; and a cap plate coupled to an upper portion of the case to seal the case, wherein the secondary negative electrode non-coated portion is attached to an inner surface of the case.

\* \* \* \* \*